(12) United States Patent
Richeux et al.

(10) Patent No.: US 7,690,957 B2
(45) Date of Patent: Apr. 6, 2010

(54) AMPHIBIOUS VEHICLE WHICH HAS ELEMENTS FOR FORMING A FLOATING BRIDGE

(75) Inventors: Elisabeth Richeux, La Ciotat (FR); Henri Aubert, Sanary (FR)

(73) Assignee: Constructions Industrielles de la Mediterranee - CNIM, Paris (FR)

( * ) Notice: Subject to any disclaimer, the term of this patent is extended or adjusted under 35 U.S.C. 154(b) by 432 days.

(21) Appl. No.: 11/569,176

(22) PCT Filed: Sep. 21, 2006

(86) PCT No.: PCT/FR2006/002164
§ 371 (c)(1),
(2), (4) Date: Nov. 16, 2006

(87) PCT Pub. No.: WO2008/034956
PCT Pub. Date: Mar. 27, 2008

(65) Prior Publication Data
US 2008/0280513 A1 Nov. 13, 2008

(51) Int. Cl.
*B60F 3/00* (2006.01)
*E01D 15/14* (2006.01)
*E01D 15/20* (2006.01)
*E01D 15/22* (2006.01)

(52) U.S. Cl. .............. 440/12.5; 14/2.6; 14/27
(58) Field of Classification Search ....... 440/12.5–12.7; 14/2.6, 27–30
See application file for complete search history.

(56) References Cited

U.S. PATENT DOCUMENTS

| 3,021,544 | A | * | 2/1962 | Gillois et al. | 14/27 |
| 3,269,349 | A | | 8/1966 | Gehlen | |
| 3,628,490 | A | * | 12/1971 | Gehlen | 14/2.6 |
| 3,643,618 | A | * | 2/1972 | Gehlen | 14/2.6 |
| 6,722,931 | B2 | | 4/2004 | Eberl | |

FOREIGN PATENT DOCUMENTS

| EP | 1 332 896 A1 | | 8/2003 |
| GB | 1 544 611 | | 4/1979 |
| GB | 1544611 A | * | 4/1979 |

\* cited by examiner

*Primary Examiner*—Ajay Vasudeva
(74) *Attorney, Agent, or Firm*—Leydig, Voit & Mayer, Ltd.

(57) ABSTRACT

An amphibious vehicle which has elements, such as caissons, floats, and ramps, arranged on a self-propelled rolling base, oriented essentially parallel to a longitudinal axis of the rolling base, when the vehicle is in a folded configuration for movement on land, and which are deployed to form a track or bridge portion oriented transversely with respect to the longitudinal axis of the rolling base, when the vehicle, alone or with another vehicle of the same design, is used to form a floating bridge or ferry. The vehicle has a deployment device for deploying elements by pivoting of four groups of the elements around four vertical shafts spaced from one another, according to at least three different configurations, each group of elements including at least one caisson.

20 Claims, 31 Drawing Sheets

Figure 1:
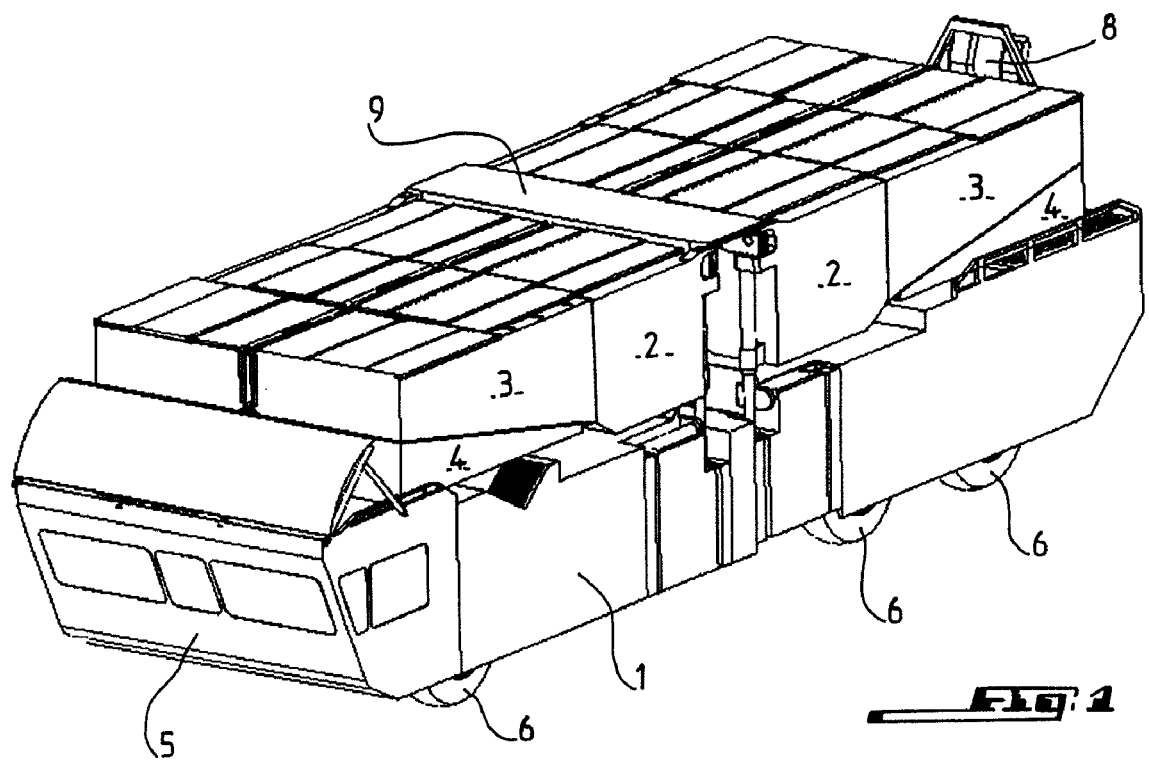

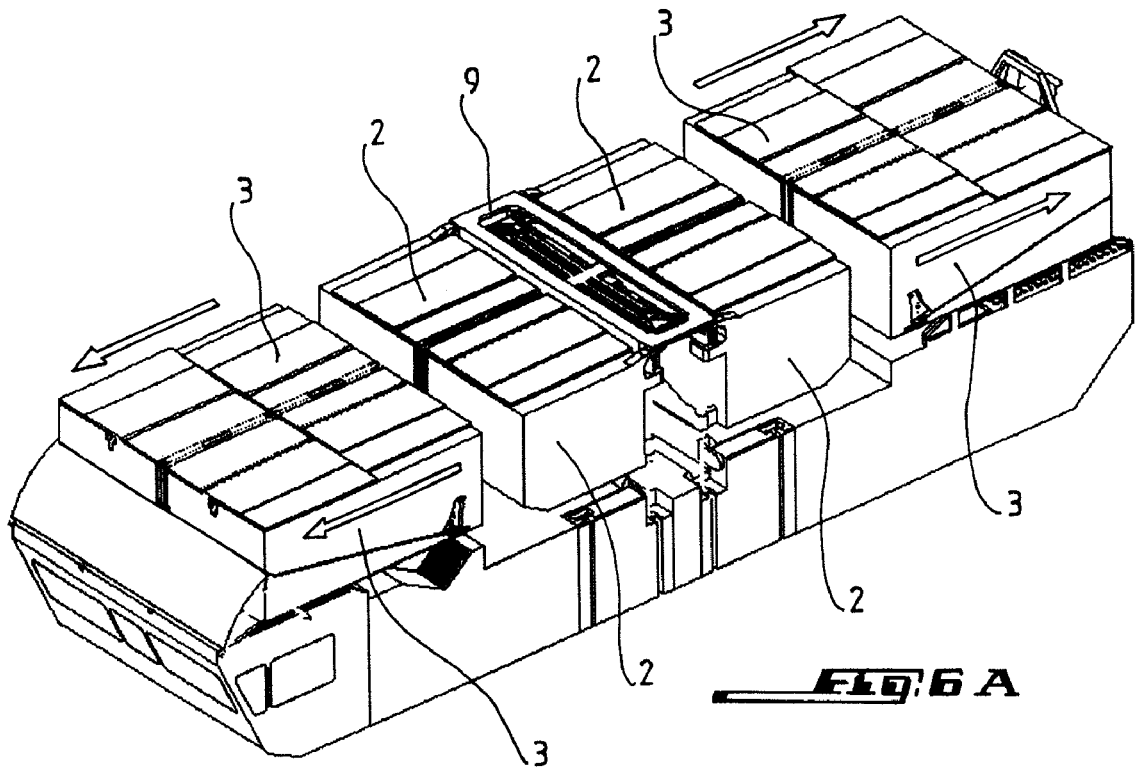
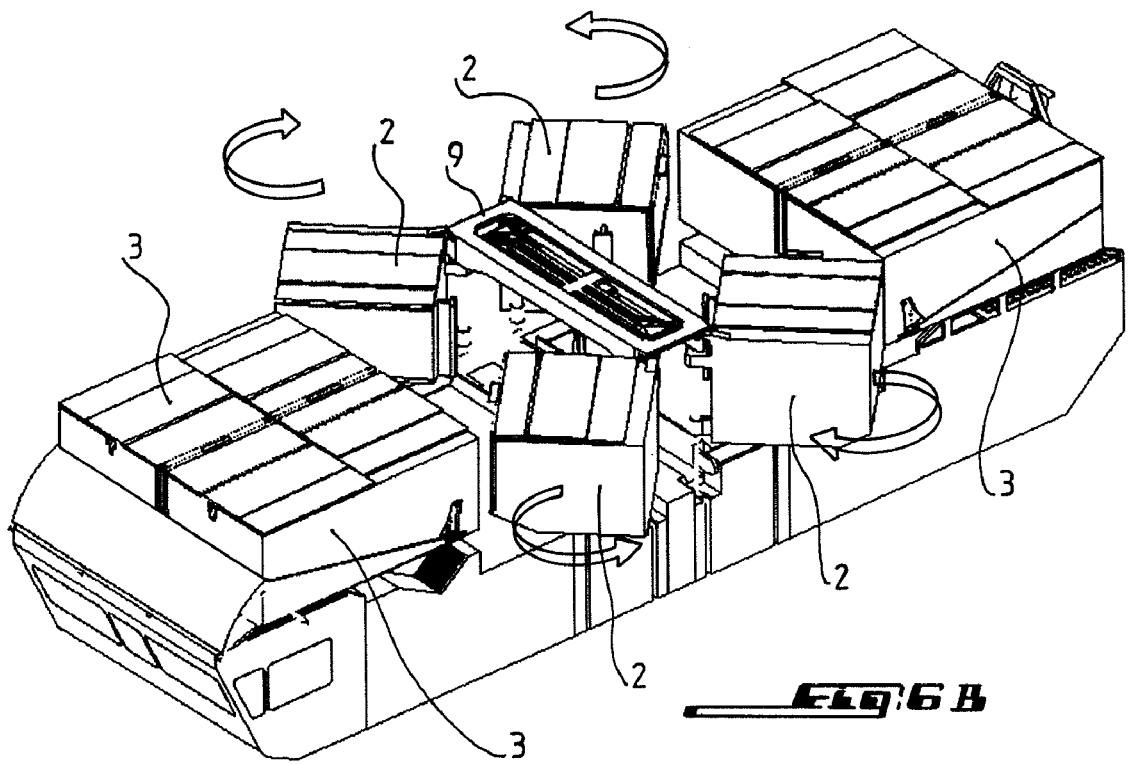

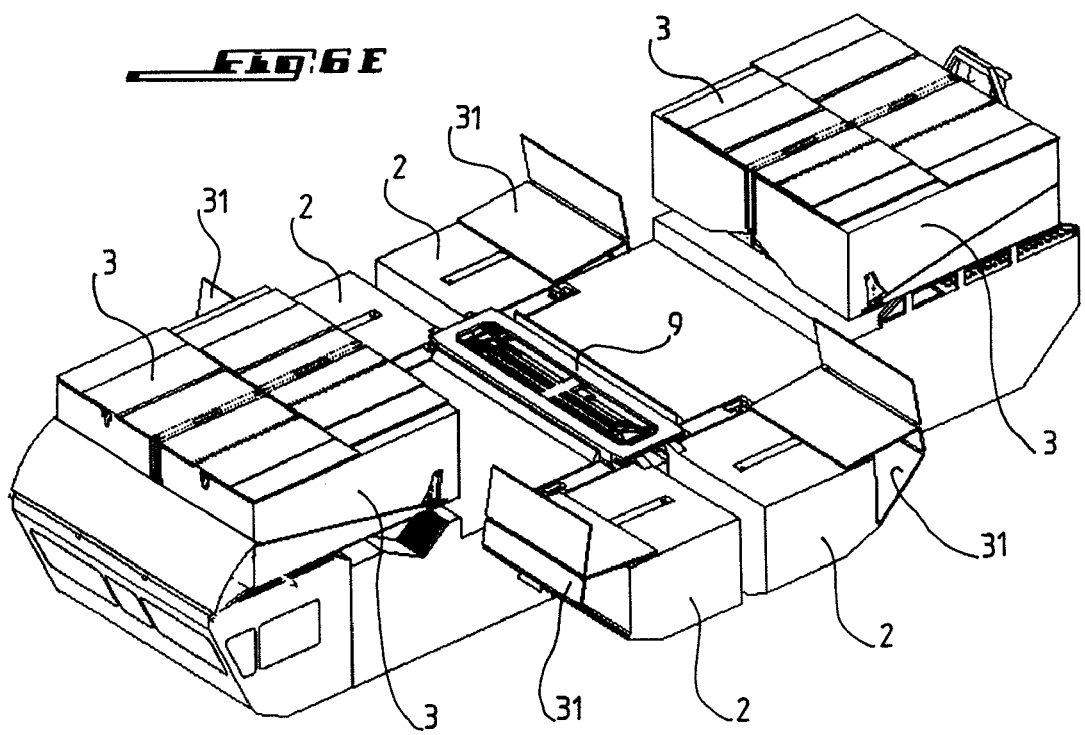
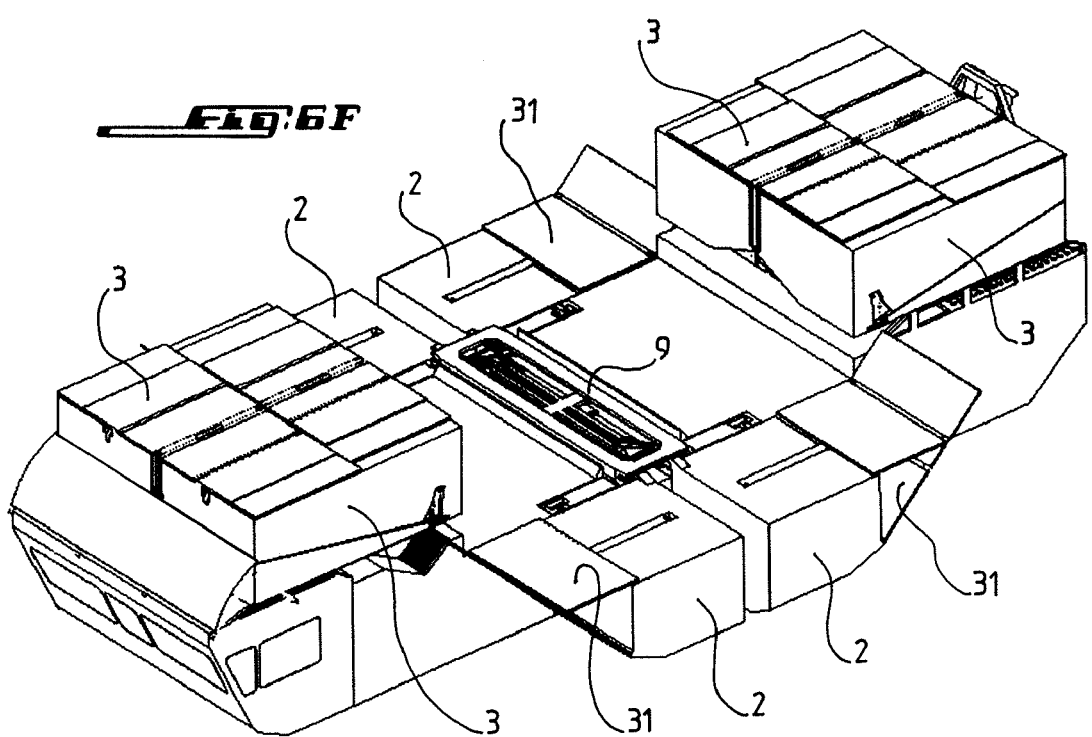

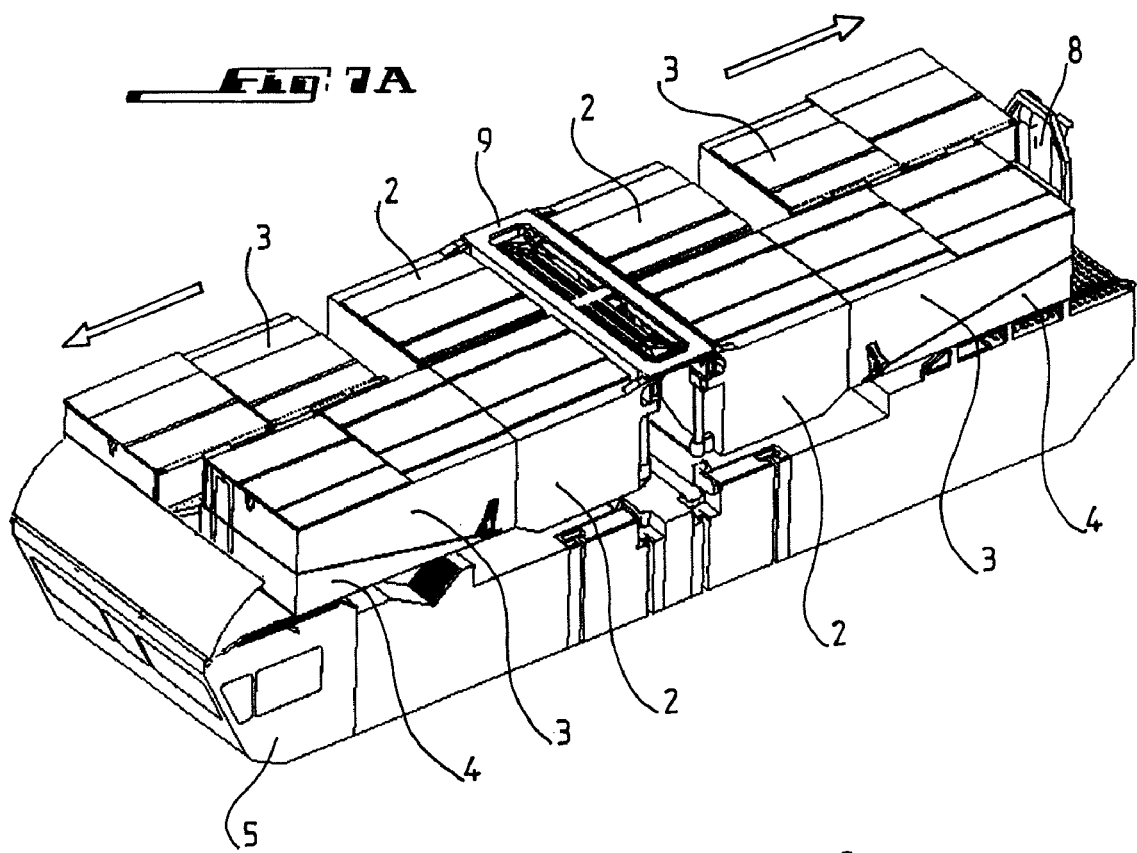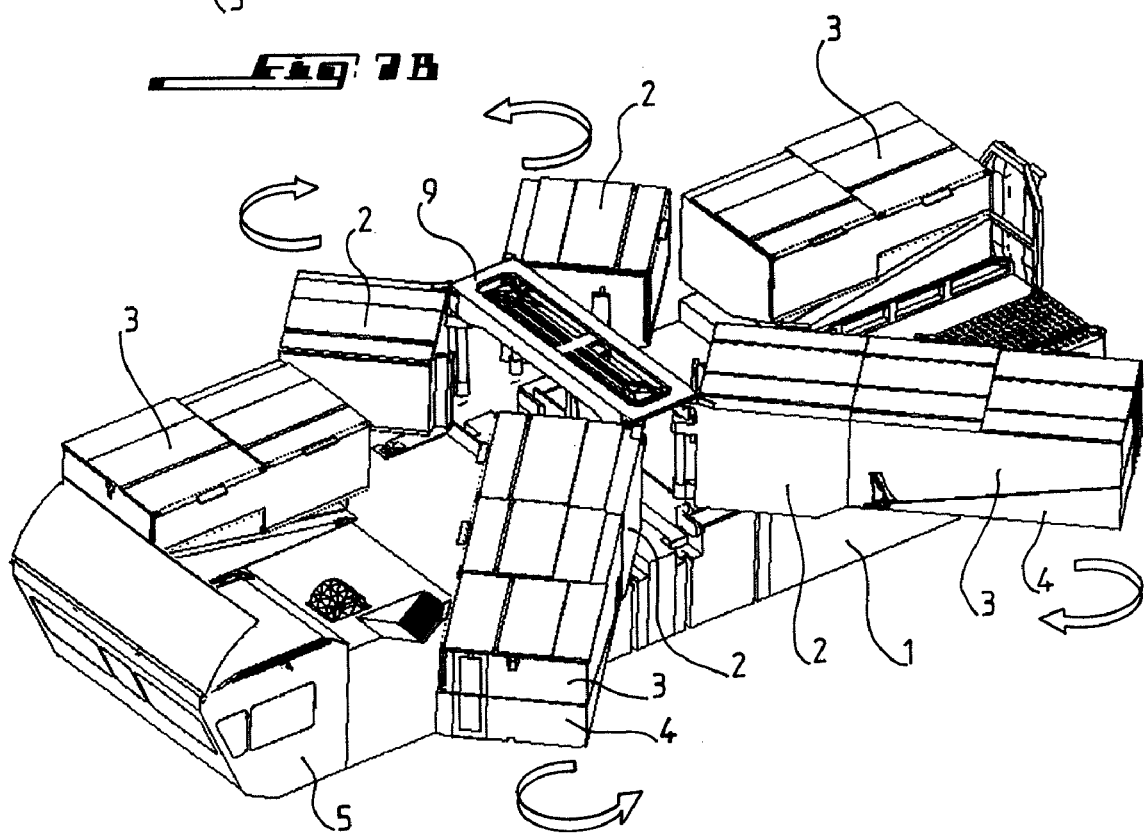

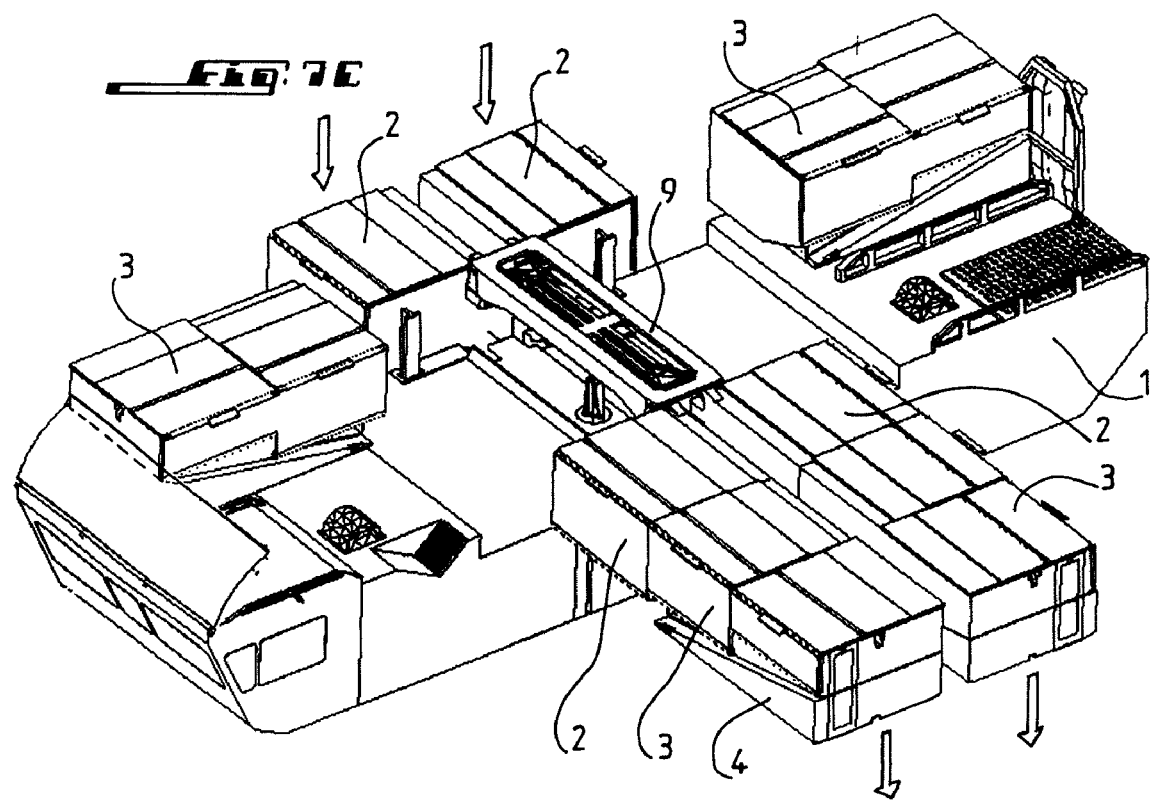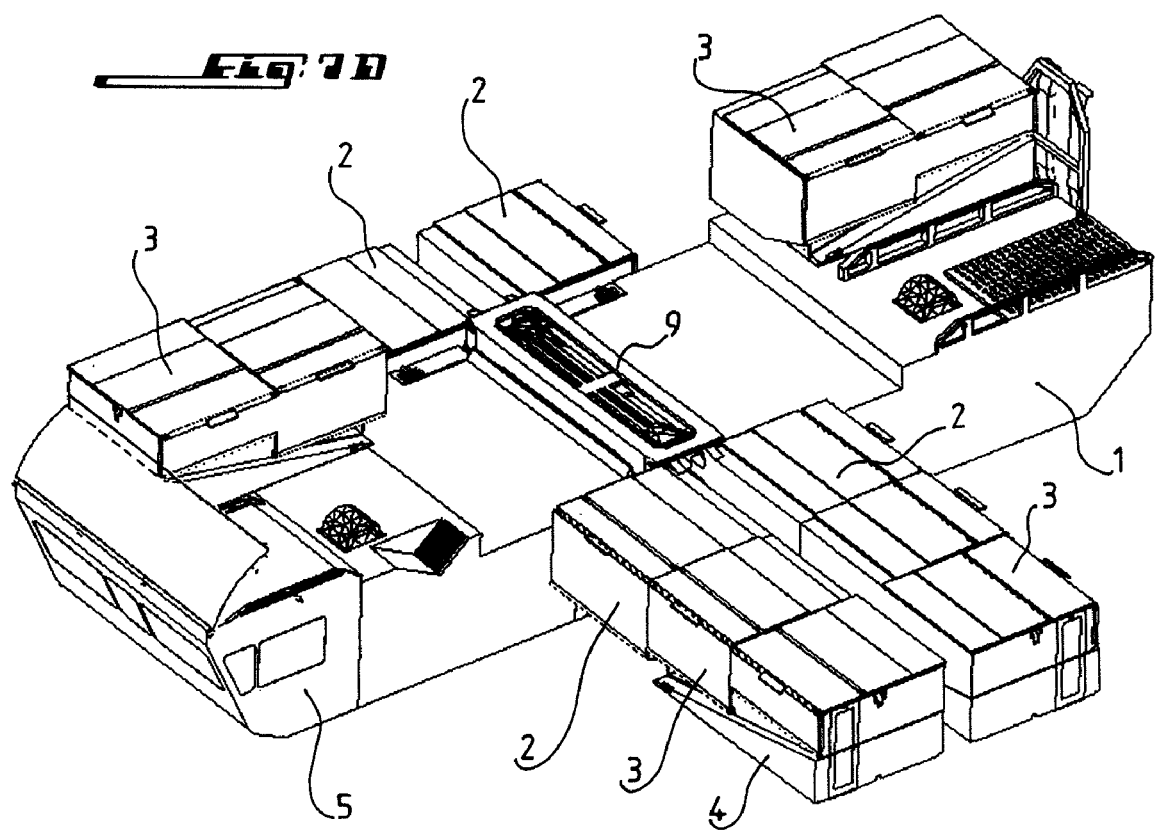

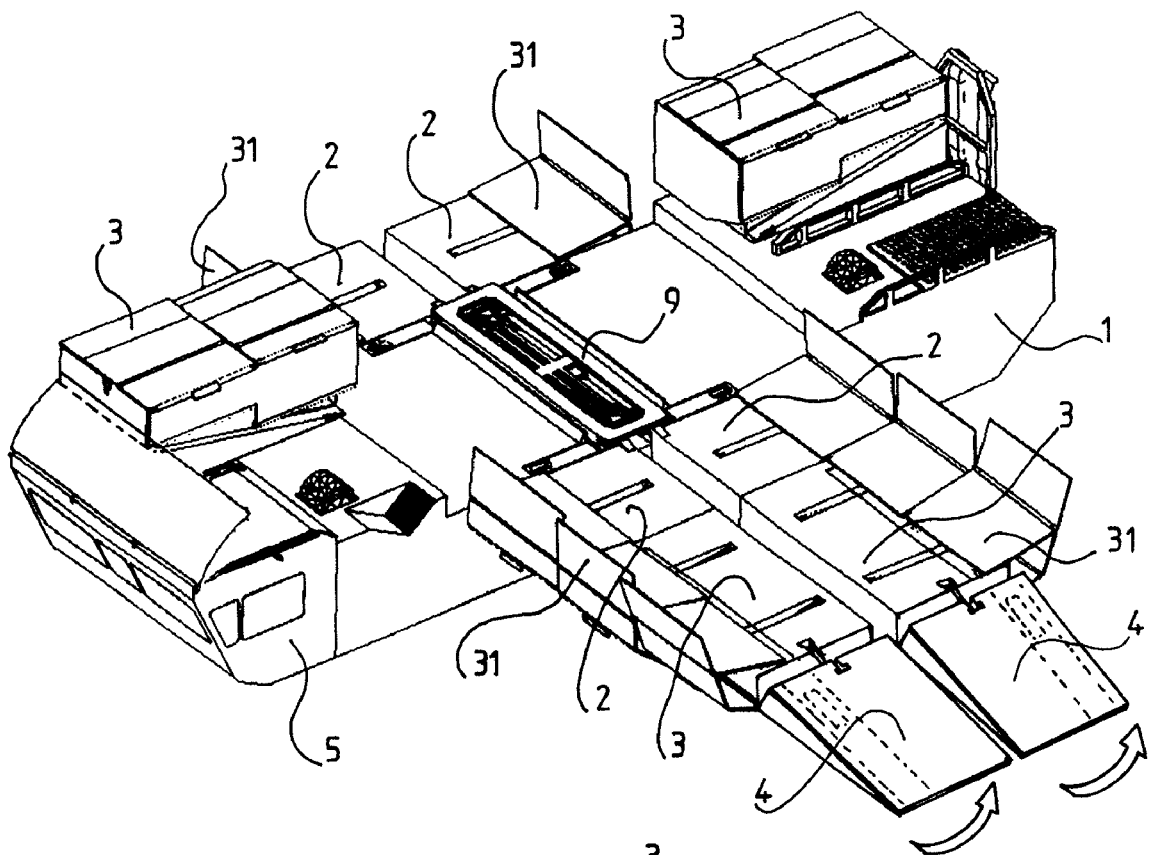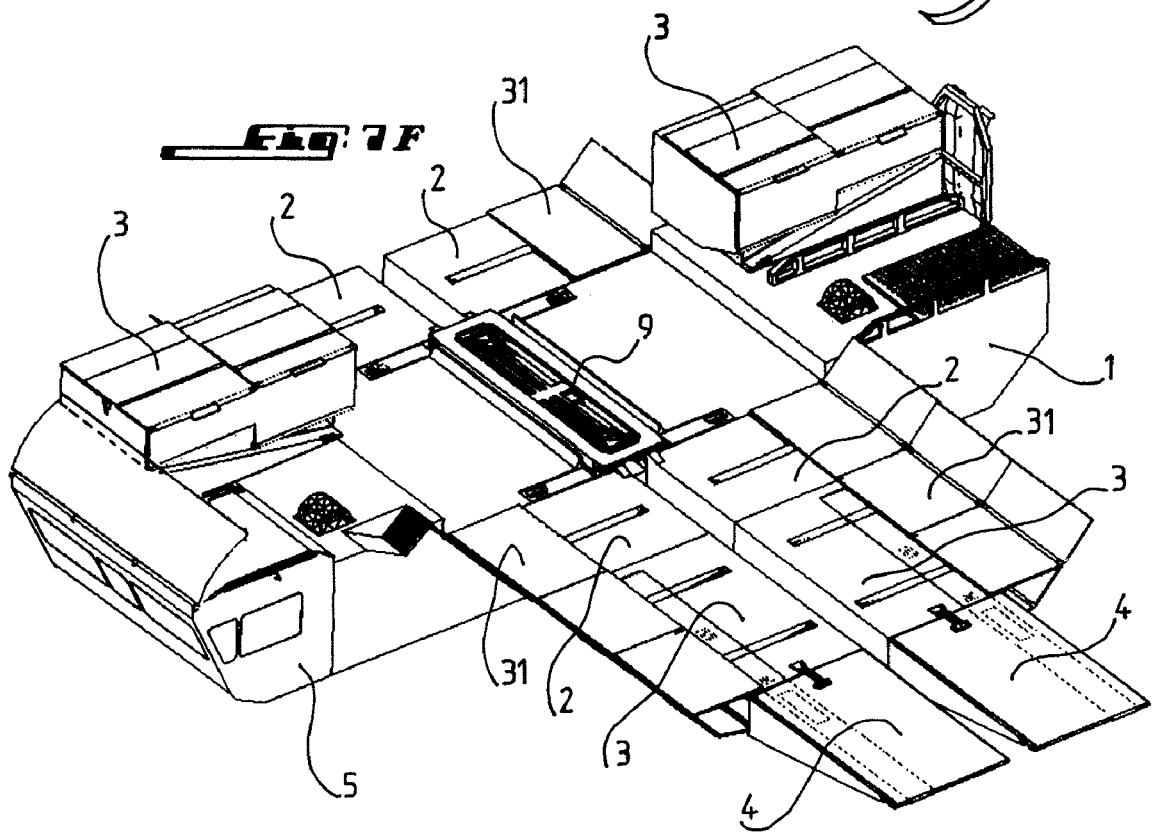

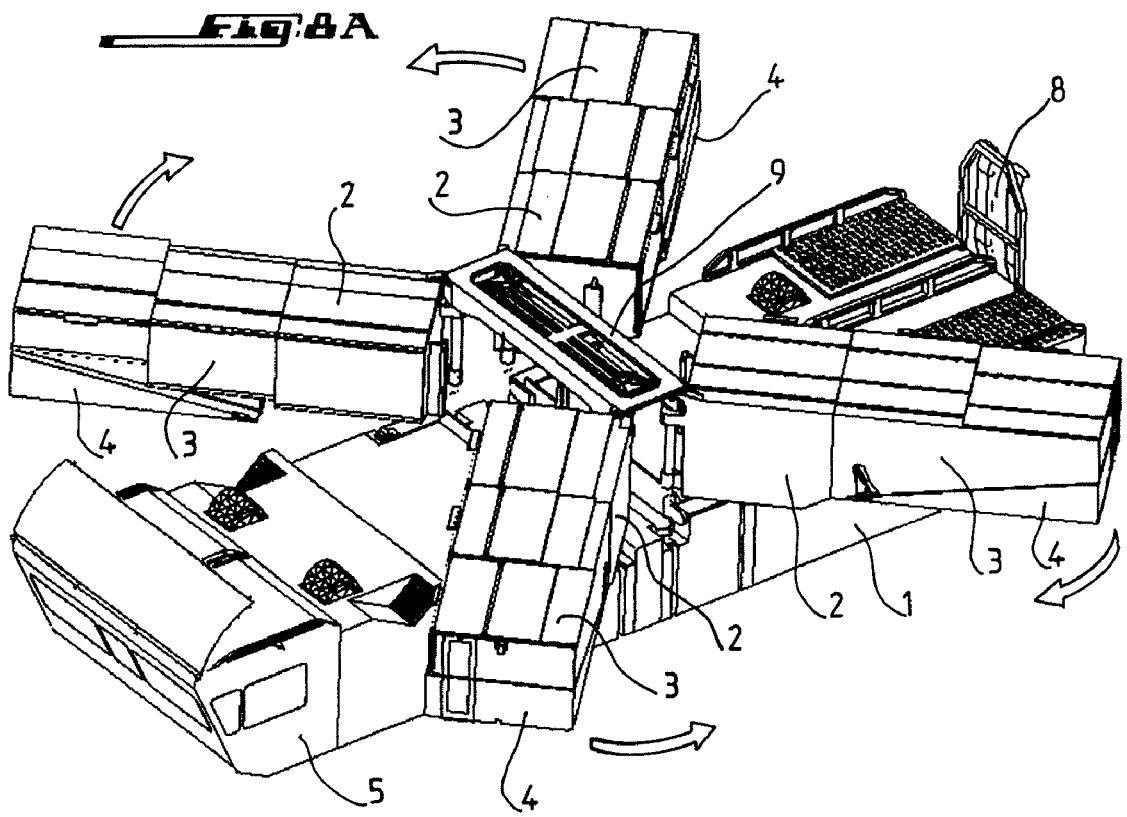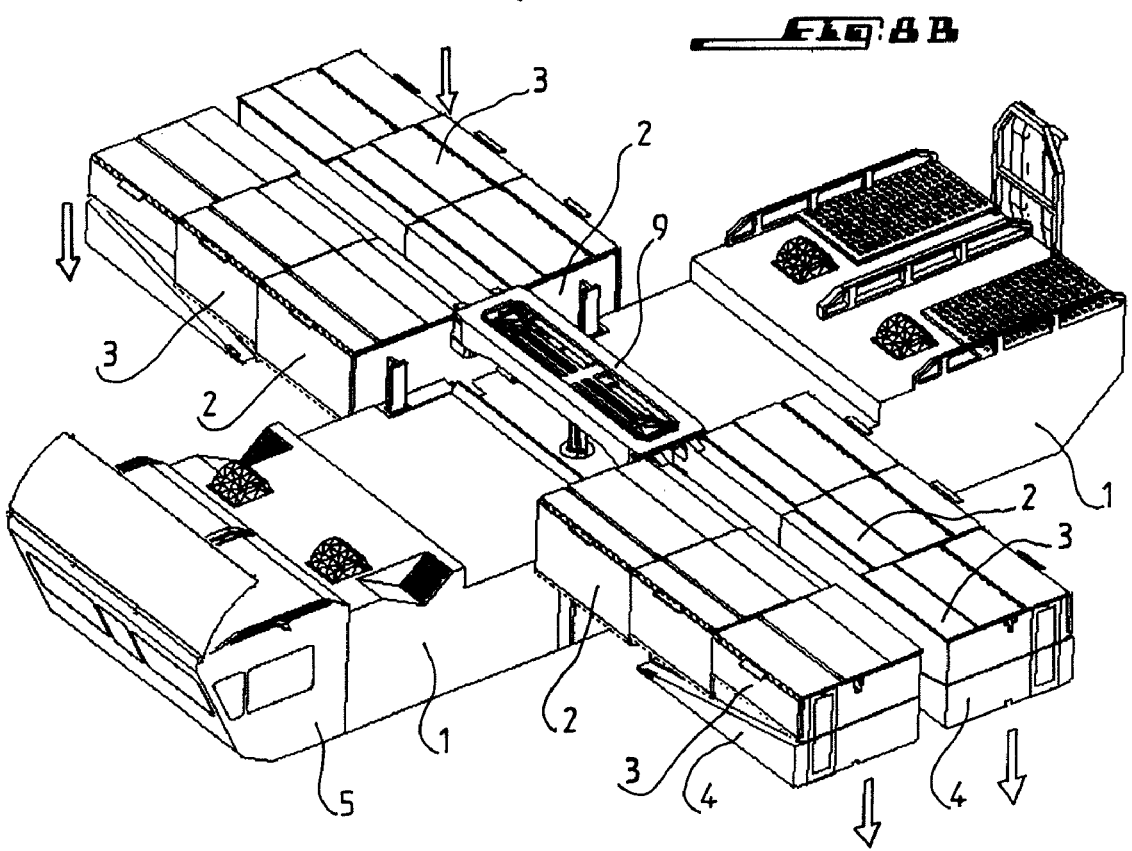

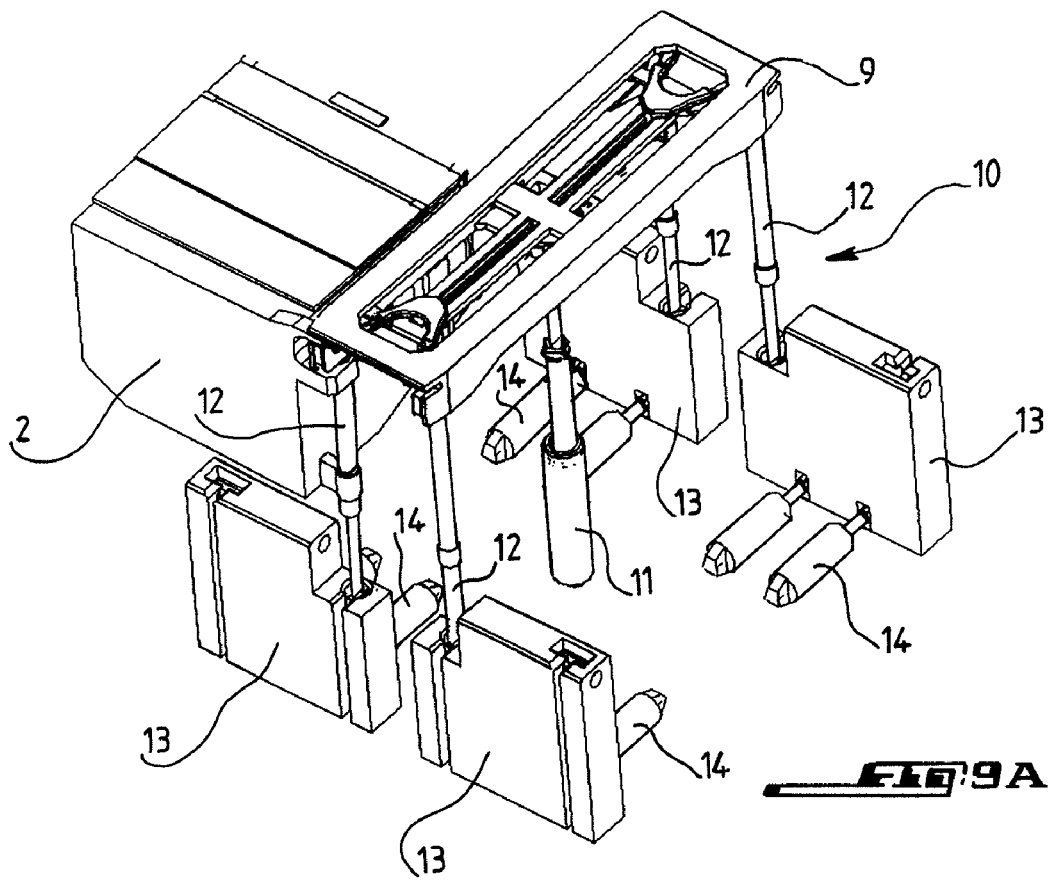
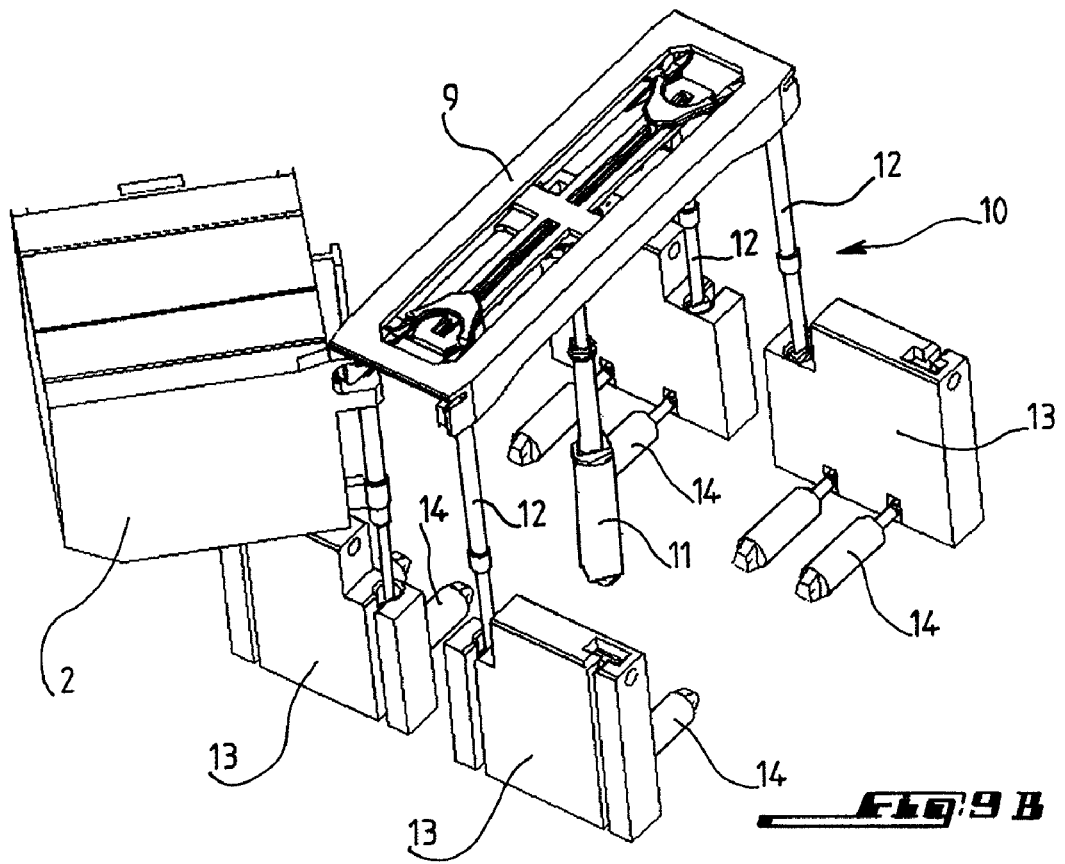

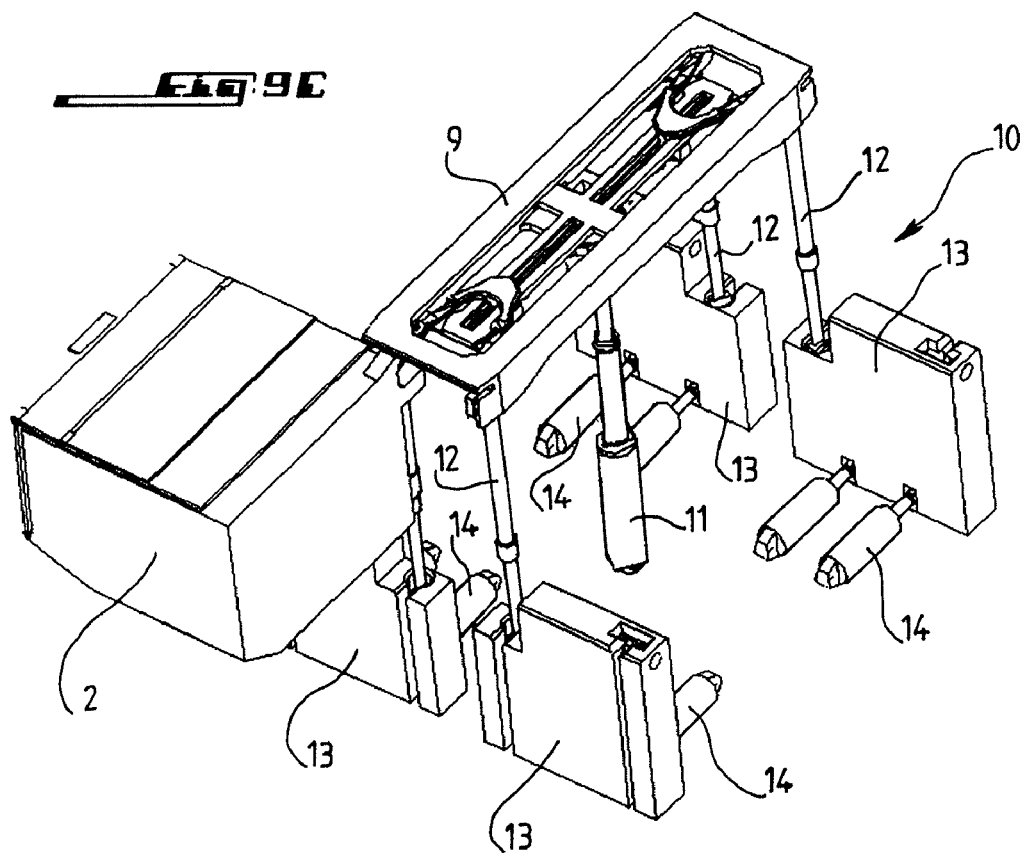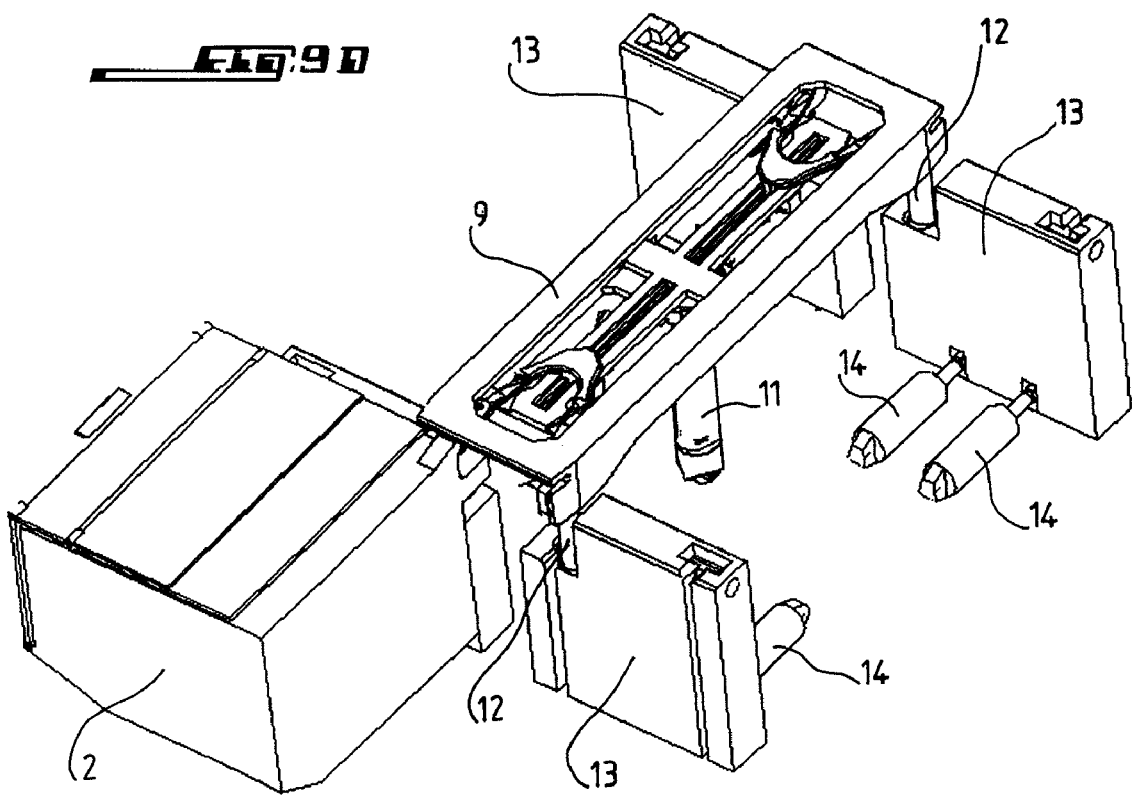

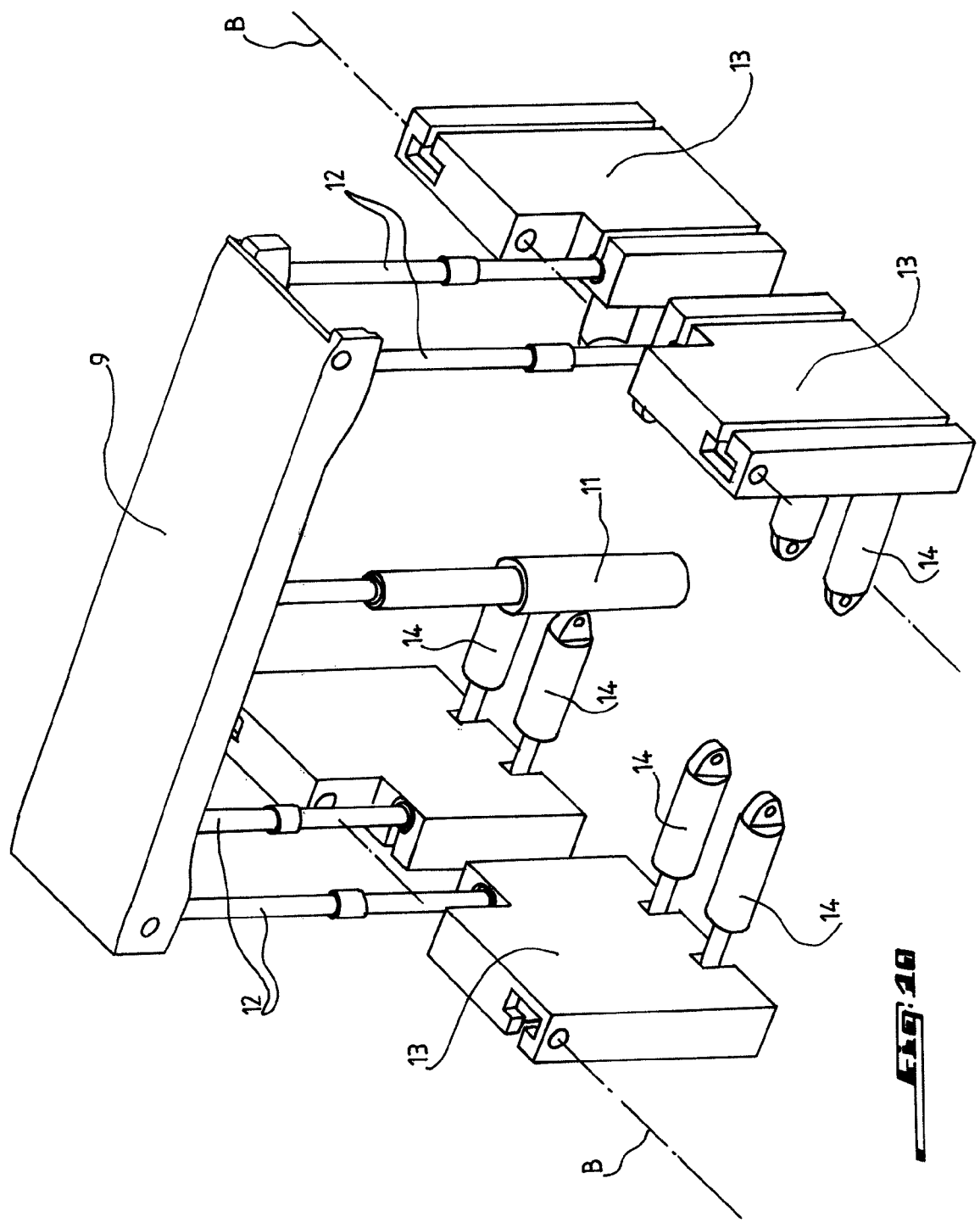

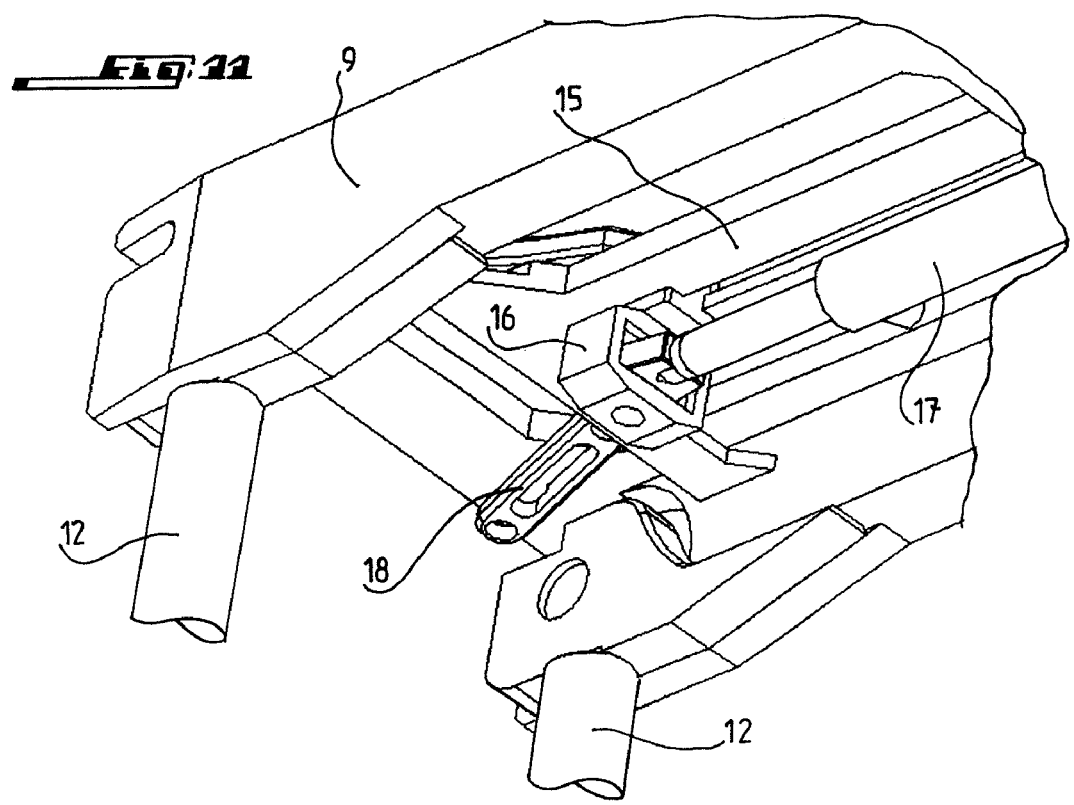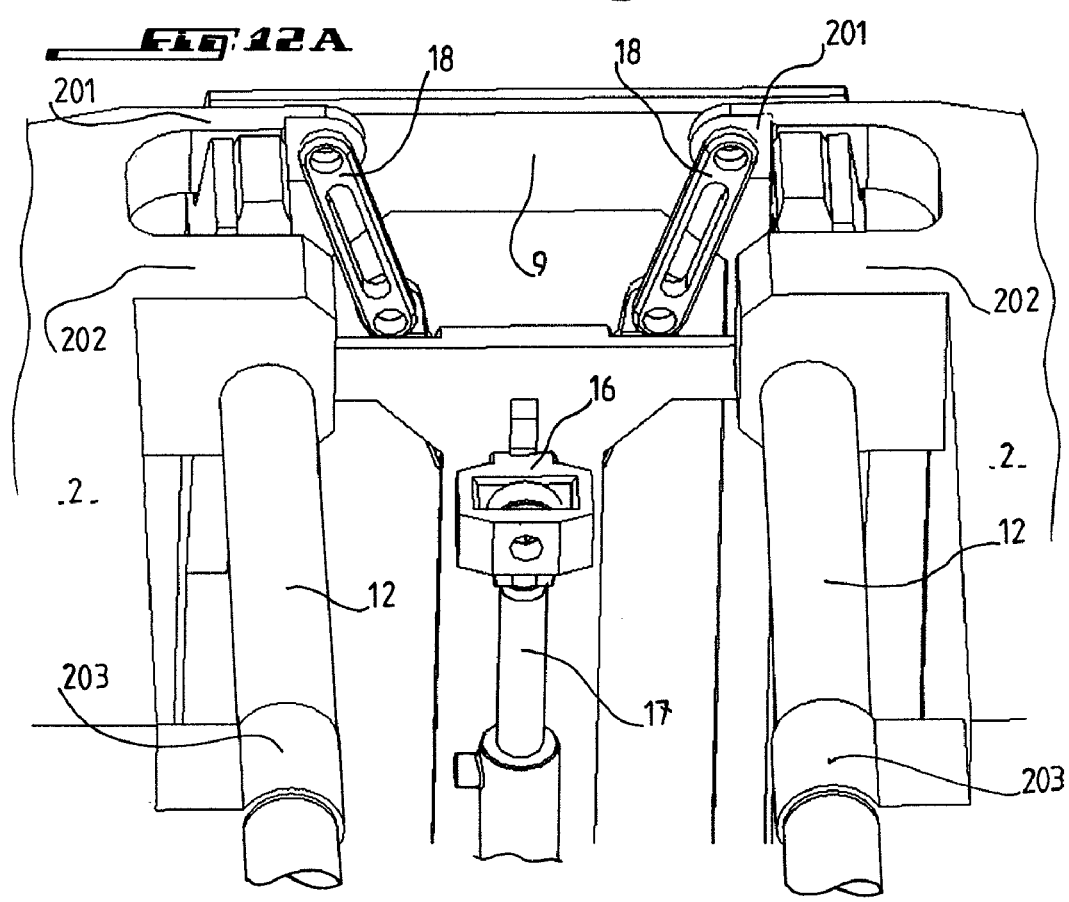

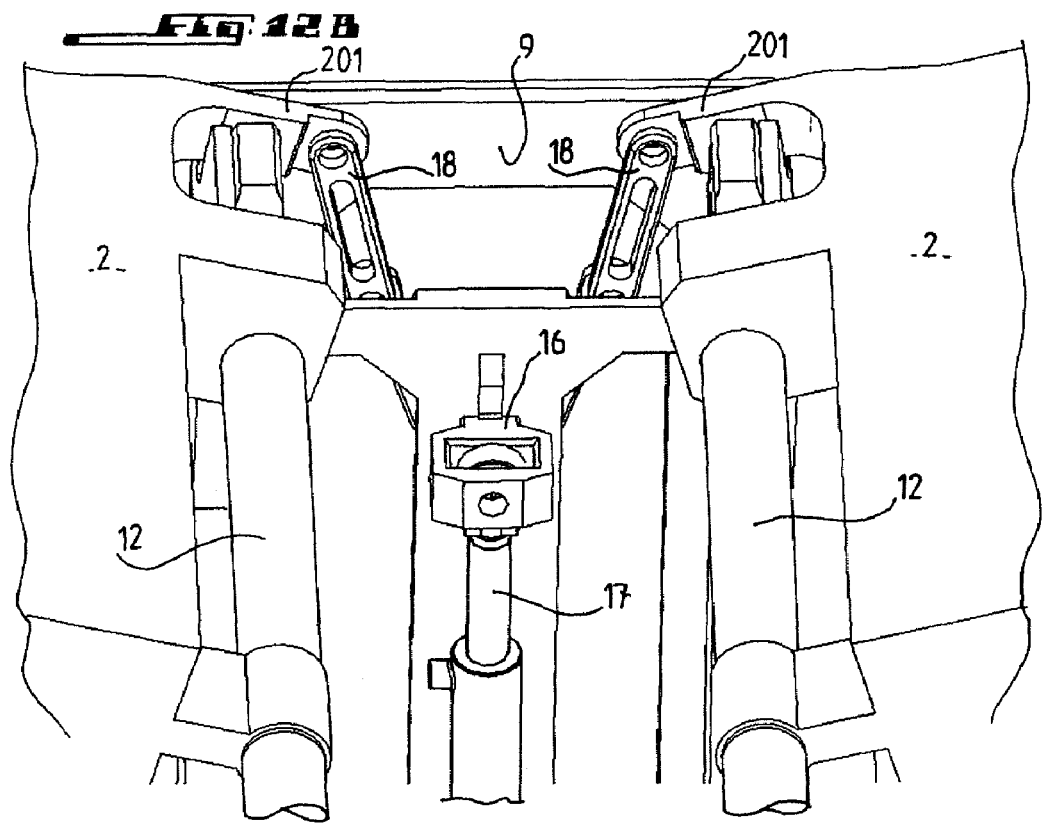
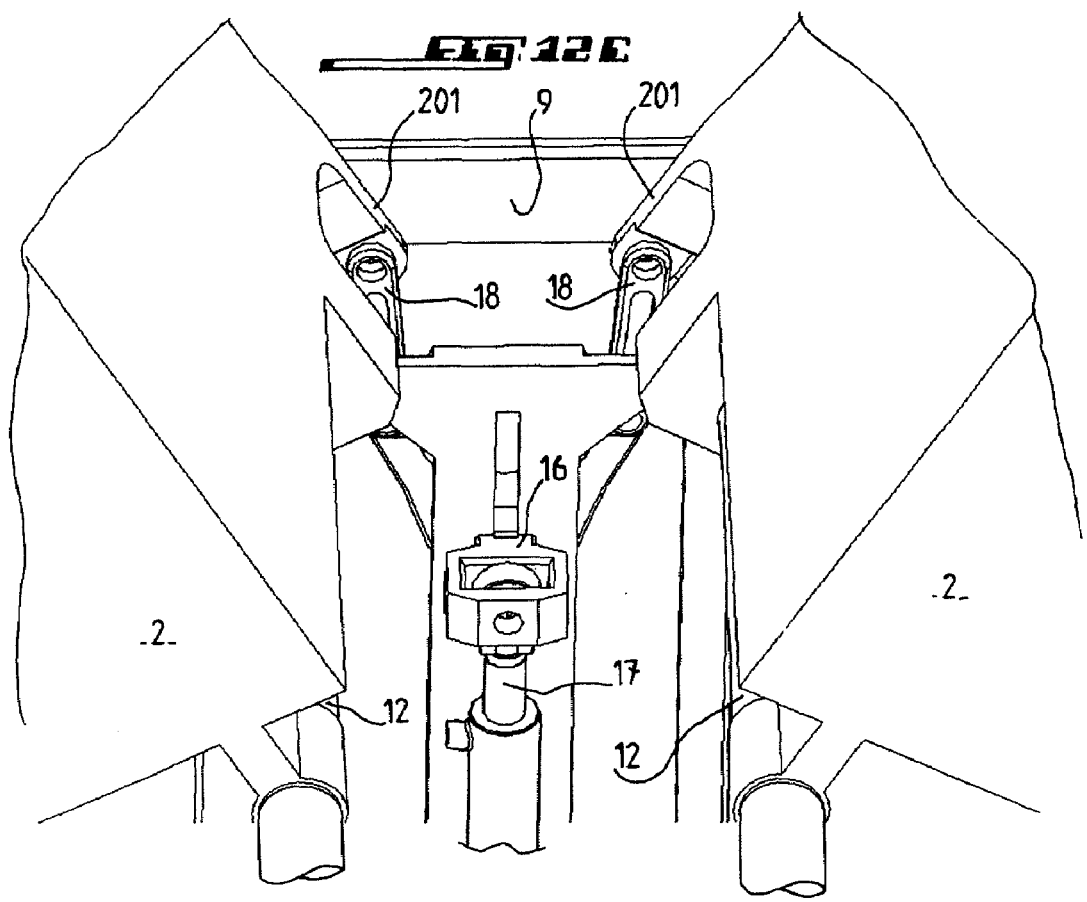

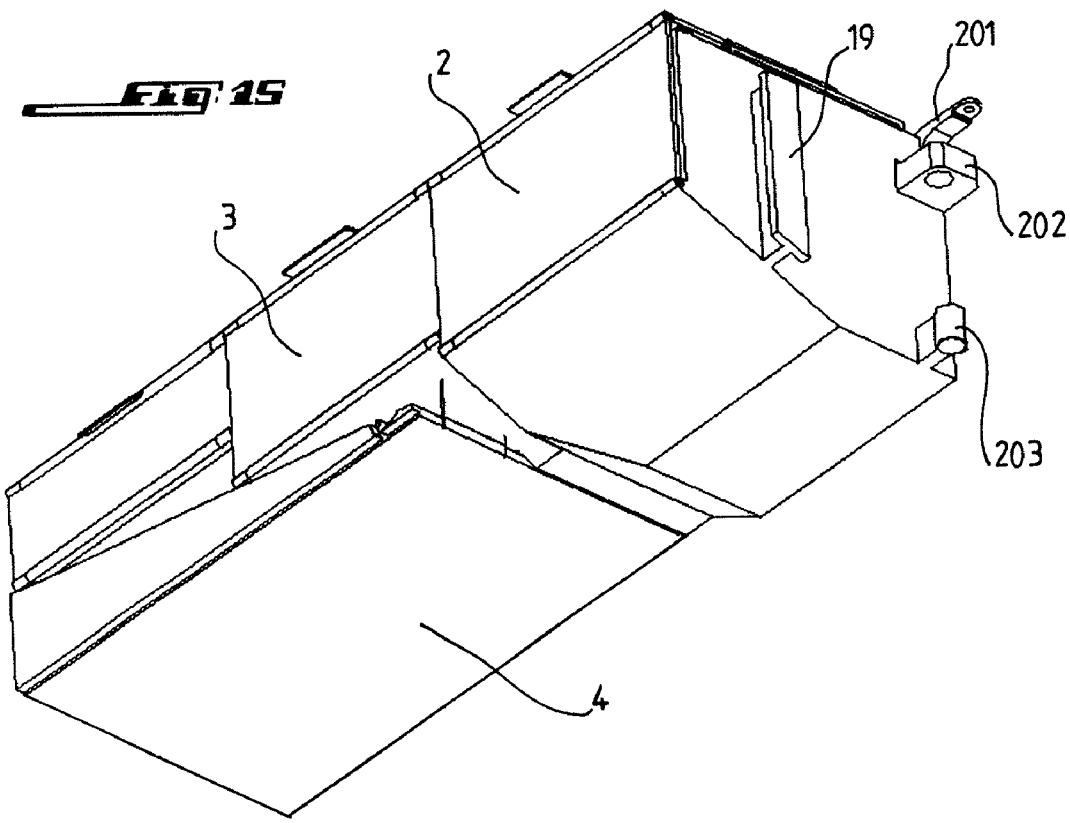
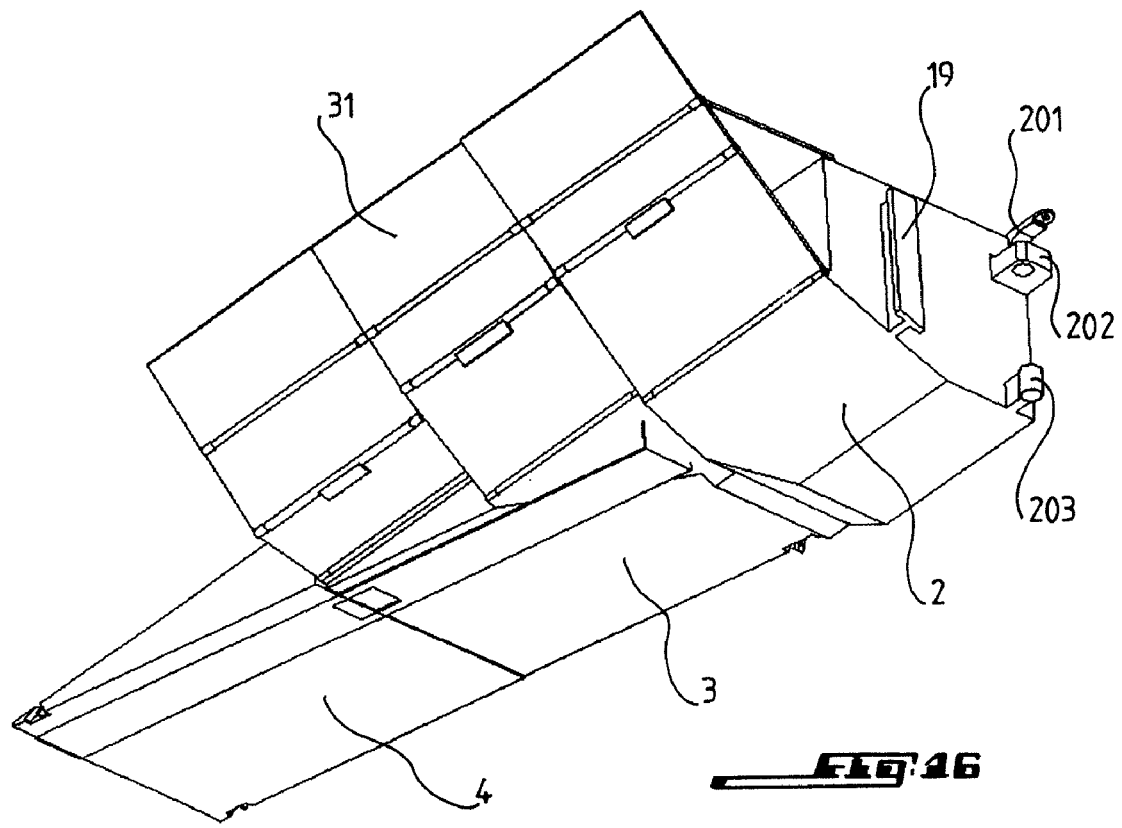

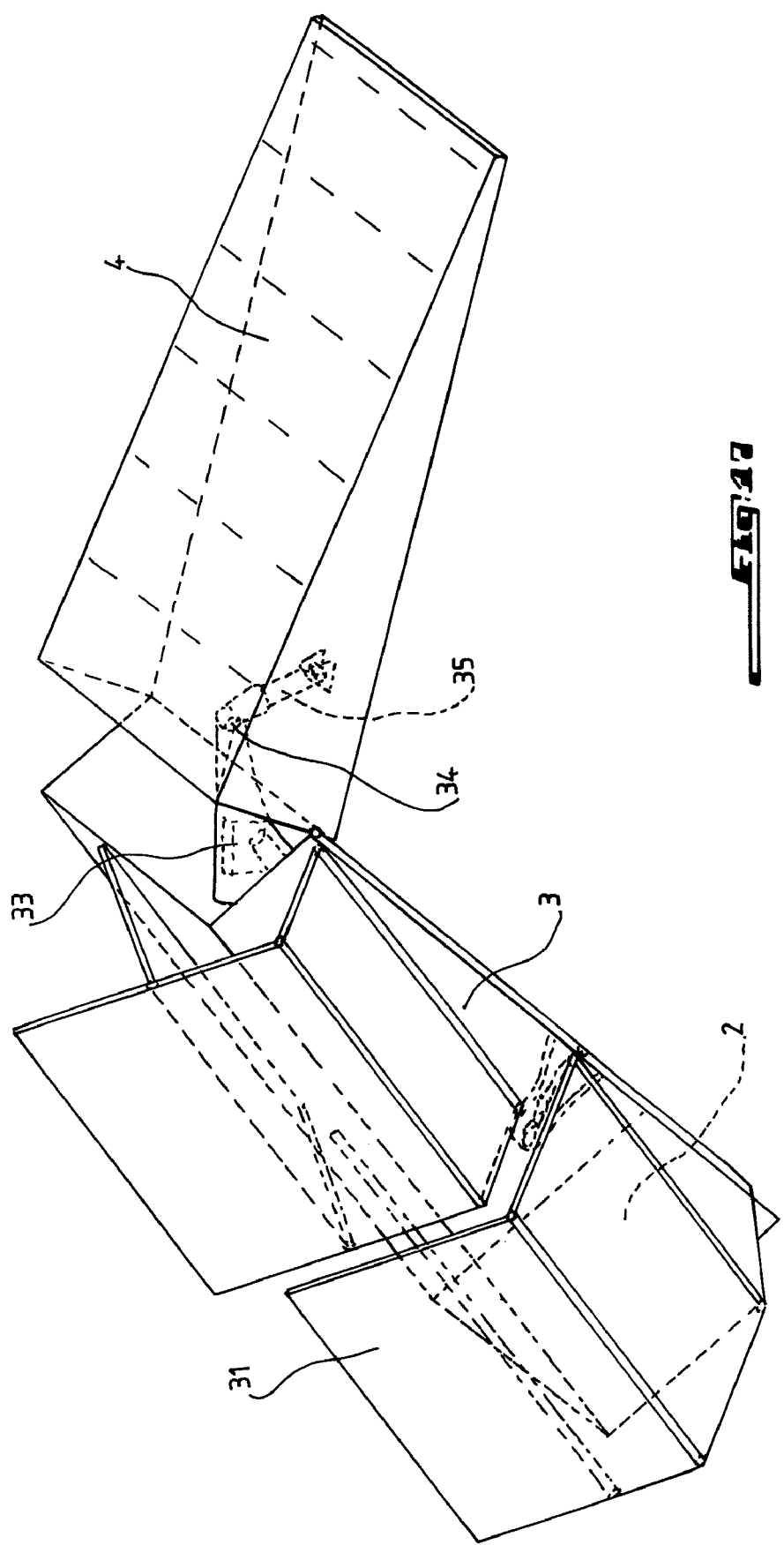

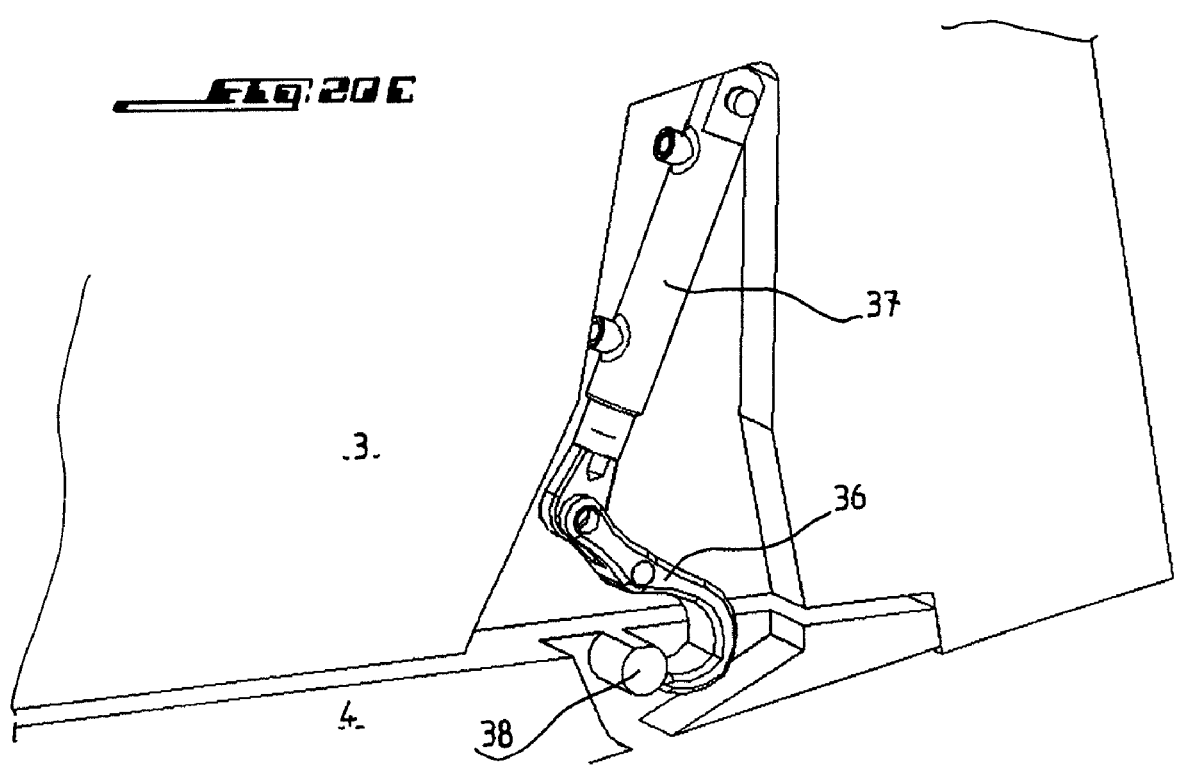
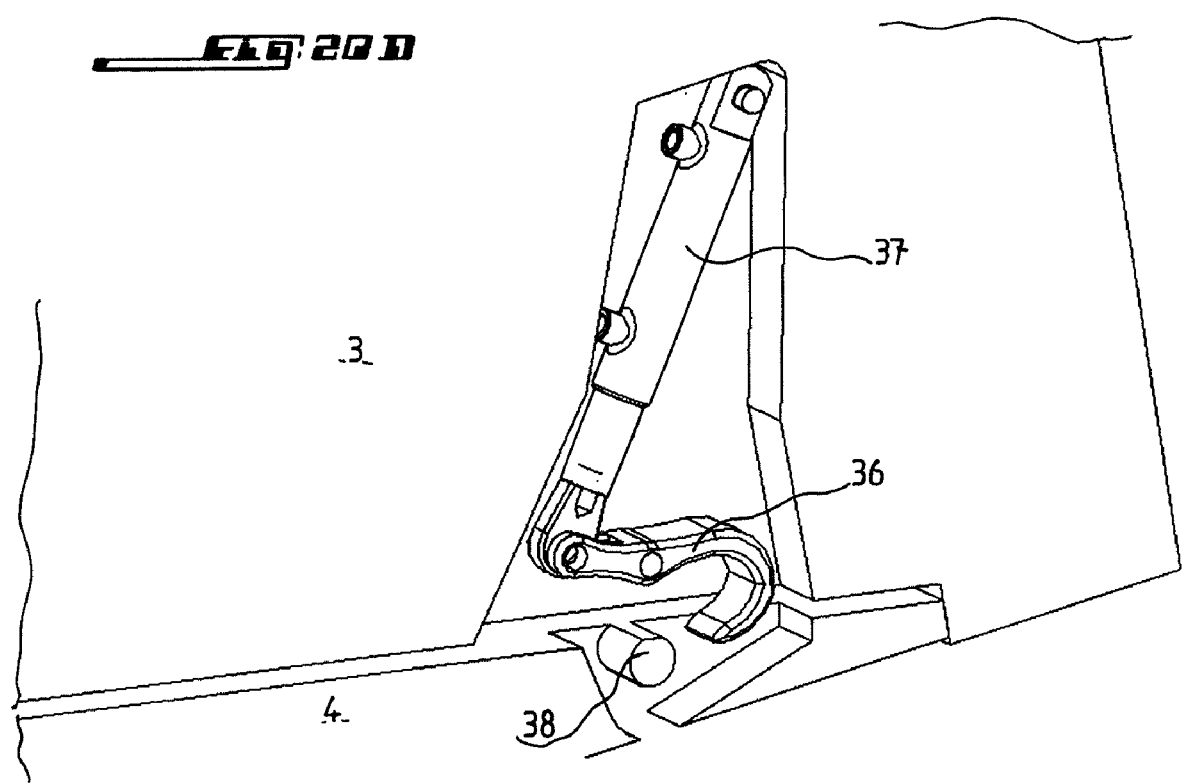

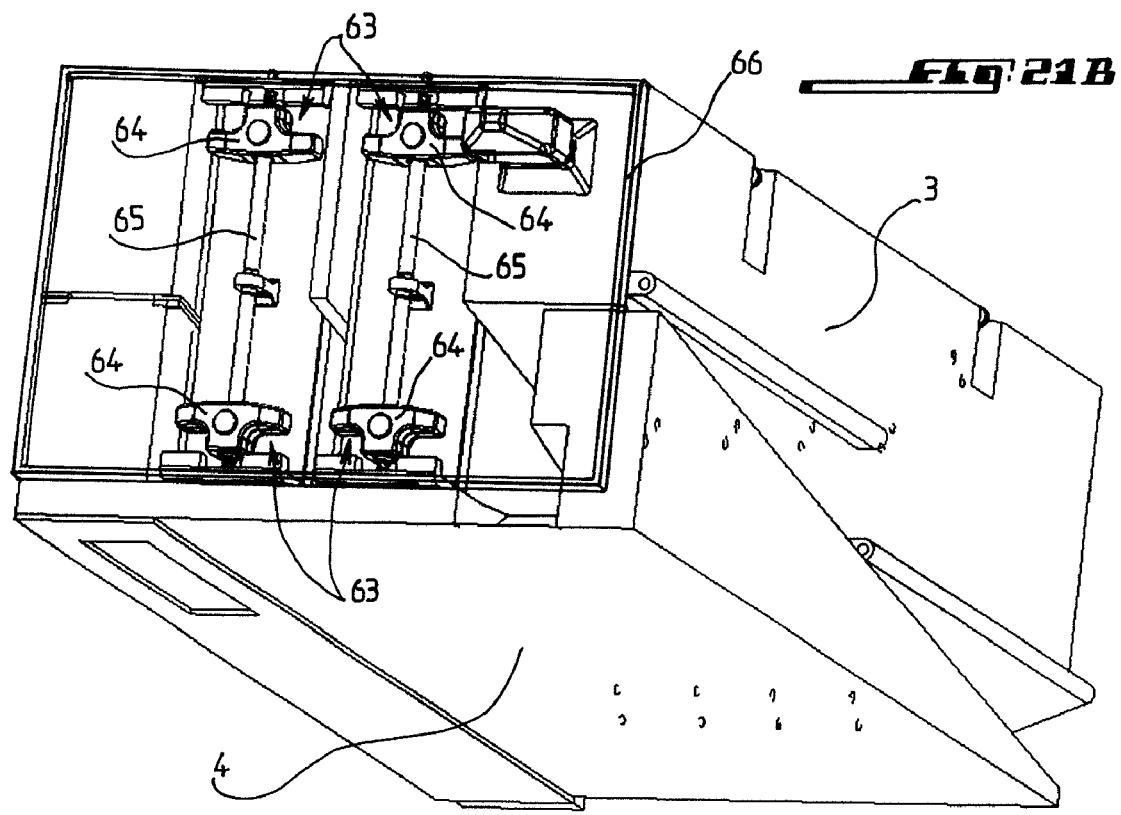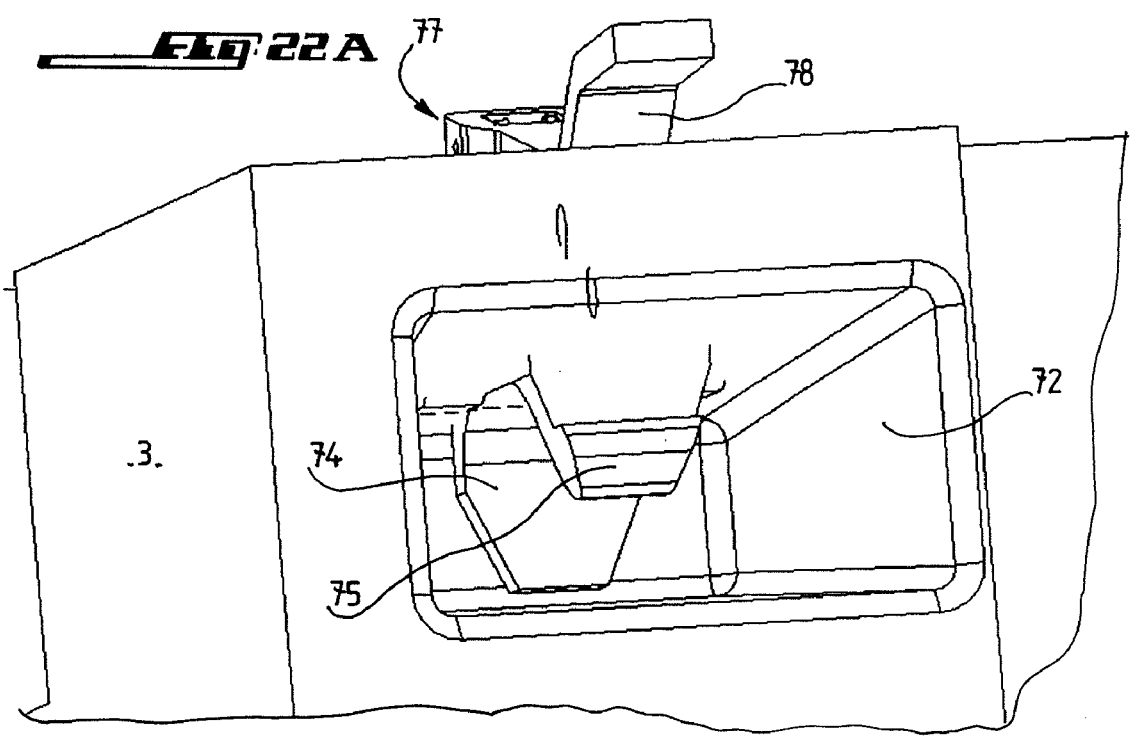

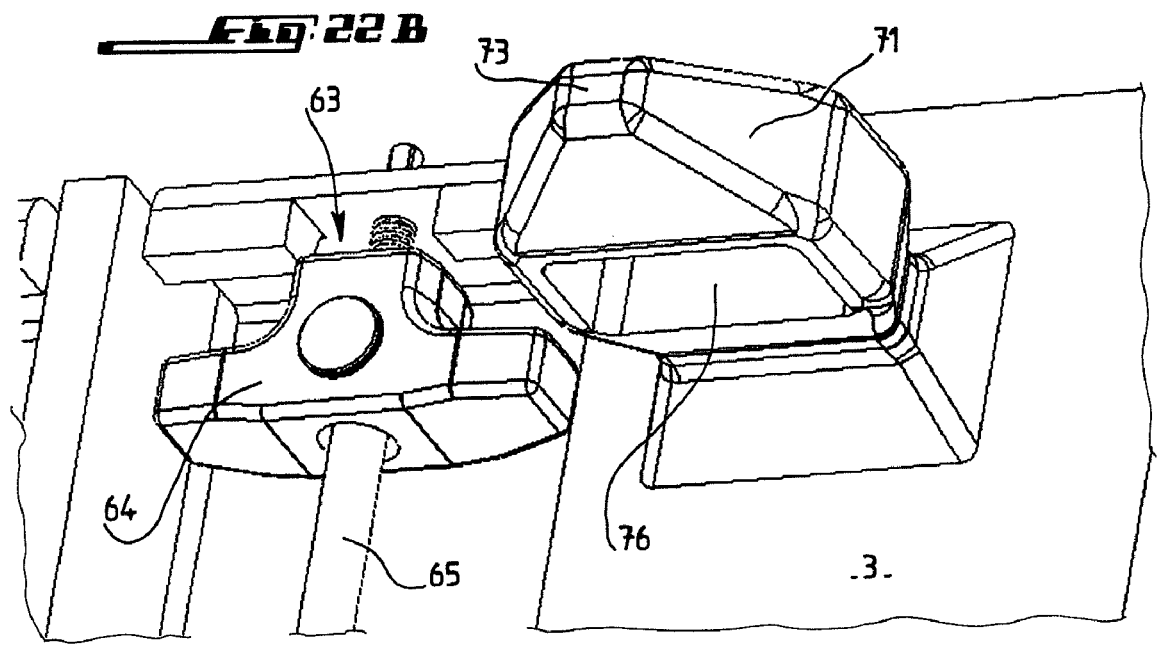
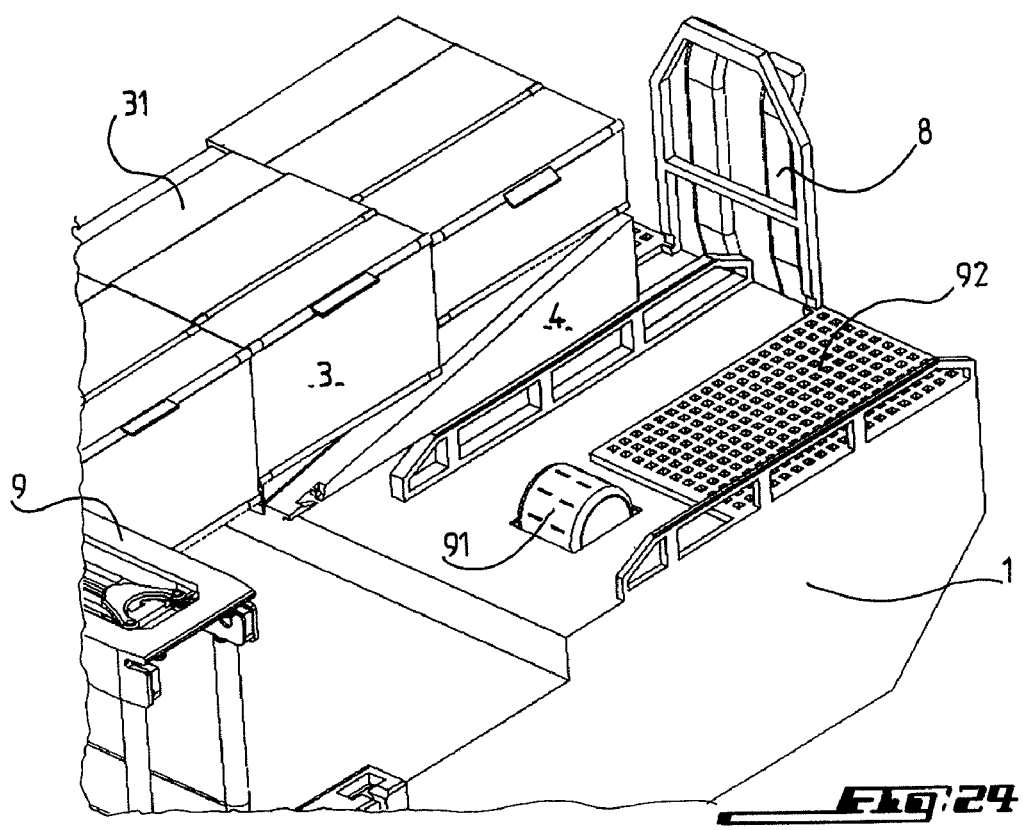

AMPHIBIOUS VEHICLE WHICH HAS ELEMENTS FOR FORMING A FLOATING BRIDGE

FIELD OF THE INVENTION

The present invention relates to an amphibious vehicle which has elements such as caissons, floats and ramps for forming a floating bridge.

The vehicle of the invention forms part of the systems for crossing wet gaps for heavy vehicles, which are integrated in an amphibious vehicle authorized for road transport as well as river transport.

BACKGROUND

Crossing wet or dry gaps being principally but not exclusively one of the main fields of activity of military engineering, the present invention will mainly concern the construction of military amphibious vehicles which need to be configured so as to be capable of enabling the crossing of vehicles, particularly heavy military vehicles, for example, up to 110 metric tons, but also personnel with their equipment. Furthermore, it is desirable for the vehicle equipped with the invention to be transportable by air so that it can be moved quickly from one region to another, at least by airplane and preferably also by helicopter.

In order to meet these different expectations, the amphibious vehicle must be configured so that it can be used satisfactorily and as much as possible equivalently on water as well as on land. Furthermore, it must be capable, without outside help, of crossing the intermediate region between the water and the ground and must in particular be capable of adapting to the morphology of the banks or shores. Finally, without being exhaustive as to the characteristics required of an amphibious vehicle to which the vehicle of the invention responds, the amphibious vehicle must be capable of being used alone or in combination with a number of other vehicles of the same design in order to form a floating bridge.

In order to be able to meet the requirements of road travel as well as of positioning in the form of a floating bridge, the elements necessary for forming a bridge, such as caissons, floats and ramps, have in the past been arranged in different manners on a vehicle in the form of a self-propelled rolling base. Among the different attempted configurations is also that of a turning arrangement according to which the group of caissons, ramps and possibly floats forms a unit mounted so as to pivot on the rolling base. According to this design, when the vehicle is launched, the longitudinal axis of the rolling base is oriented approximately parallel to the shore of the river or lake to be crossed. And when the vehicle is in position, the group of elements forming the bridge is turned in one direction or the other approximately 90° around a vertical axis.

However, the diversity of the morphologies of the wet or dry gaps to be crossed requires the ability to adapt the arrangement of the elements forming a floating bridge. In this sense, it has proven disadvantageous to have to turn the group of elements in the form of a single unit.

SUMMARY OF THE INVENTION

The aim of the invention is to propose an amphibious vehicle which has elements such as caissons, floats and ramps arranged on a self-propelled rolling base in such a way that they can be deployed according to different configurations.

The aim of the invention is attained with an amphibious vehicle which has elements such as caissons, floats and ramps arranged on a self-propelled rolling base, some of them at least partially over the others and according to an orientation essentially parallel to a longitudinal axis of the rolling base, when the vehicle is in a folded up configuration for movement on land, and which are configured so that they can be deployed in such a way as to form a track or bridge portion oriented transversely with respect to the longitudinal axis of the rolling base, when the vehicle, alone or with another vehicle of the same design, is intended to form a floating bridge or ferry.

According to the invention, the vehicle has a deployment device configured so that it can deploy the elements essentially by pivoting four groups of elements around four vertical shafts spaced from one another, according to at least three different configurations, each group of elements having at least one caisson.

Thanks to these arrangements, the vehicles of the invention are distinguished by a versatile loading capacity, particularly for use in ferry mode, which allows the crossing of vehicles of medium class (for example, military load class MLC35) with one module, of heavy tank class (for example, MSC70) with two modules, and up to heavy wheeled vehicle class (for example, MLC100) with three modules. Furthermore, the vehicle of the invention is distinguished by its ability to form a bridge making it possible to cover gap widths starting from 23 meters, by the complete automation of the deployment operations and the very extensive automation of the operations for connection between vehicles, as well as by the small space requirement and weight making air transport by means of medium capacity aircraft possible.

The vehicle of the invention is configured so that it can be deployed from its folded up configuration into different deployment configurations or modes depending on whether the vehicle is used alone or in combination with one or more other vehicles of the same design, and if applicable, depending on the position in a series of coupled vehicles. The main configuration modes are the following:

short mode with deployment of the caissons only,
semi-short mode with deployment of the caissons and floats but with the ramps folded up,
semi-short mode with two ramps deployed,
long mode with all ramps folded up,
long mode with two ramps deployed on the same side, and
long mode with all ramps deployed.

The vehicle of the invention is used with all ramps folded up when it forms a central element or module of a floating bridge or of a ferry. The use of a vehicle with at least one ramp deployed and provided for cases in which, for example, the vehicle forms an end module of a floating bridge or ferry and in which it is a matter of providing access to the banks.

The vehicle of the invention is advantageously configured so as to be included in the category of medium class vehicles, that is to say on the order of MLC35, and which can board a single-vehicle ferry or cross a wet or dry gap on a bridge made up of a similar vehicle.

The vehicle of the invention has a partly conventional design for an amphibious vehicle. Thus, the vehicle has a rolling base, in the form of a sealed self-supporting body, an armored cabin for three people in the case of a military vehicle, the cabin being connected with the structure of the rolling base, a kinematic chain with at least two axles, for example two, three or four axles, with independent wheels and with integral transmission on each of the wheels, all the wheels being guiding wheels, and a central implementation device allowing the deployment of the caissons, floats and ramps according to different configurations. The vehicle can therefore have a number of configurations of use, depending on the specific mission, meeting particular conditions of the specifications, the main conditions of which are listed below.

Figure 8C:
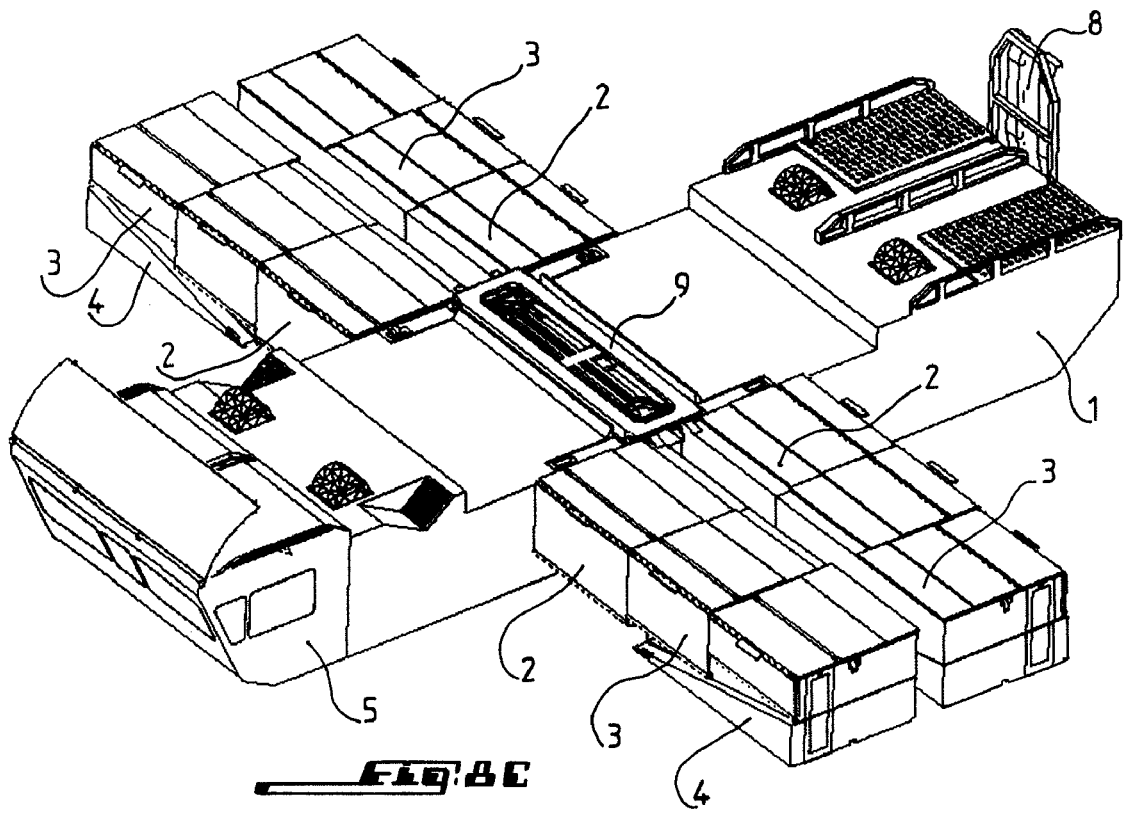

The use of a vehicle of the invention takes place essentially according to the scheme hereafter:

1. Placement of the amphibious vehicle on the bank, before the gap to be crossed, engine running and crew in the cabin (armored);
2. (optional) Total or partial deployment (see description in reference to FIG. 8A below) of the caissons-floats-ramps according to the desired configuration, on land, if the need to enter the water in deployed mode presents itself (for example, strong current); the advantage of partial deployment is the reconciling of rolling capability and limited space requirement with good stability in the current;
3. Entering the water and starting of the aquatic propellers;
4. Deployment in the water (if it has entered the water folded up) according to the procedure below:
    a. possible disconnection and translation of the floats-ramps on the body,
    b. pivoting of the caissons (with or without the floats-ramps as a function of a),
    c. locking of the caissons in position perpendicular to the body,
    d. possible deployment of the ramps,
    e. lowering of the assembly to the level of the body in the low part in the rails of the plates,
    f. locking of the caissons in the plates in low position;
5. Exit of the crew through the roof of the cabin onto the bridge for maneuvering from the outside;
6. Navigation of the vehicle for positioning with respect to another vehicle. In the case of the single-vehicle ferry, navigation to the bank for boarding of the vehicles to be transported;
7. Pre-centering and pre-locking of the connection between two vehicles;
8. Locking of the connection by activation of the locks controlled from the portable control station;
9. Navigation to the bank for boarding of the vehicles to be transported;
10. Positioning of the ramps on the bank;
11. (optional) In bridge mode, static or dynamic mooring of the bridge;
12. Boarding of the vehicles which are to be brought across;
13. Circulation of the vehicles in bridge mode or movement of the modules in ferry mode to the other bank;
14. Landing of the vehicles (after positioning of the ramps on the bank in ferry mode);
15. Disconnection of the vehicles in bridge mode or in multivehicle ferry mode;
16. Separation of the end vehicles from the bank;
17. Entry of the driver into the cabin;
18. Folding up in the water (if exiting from the water folded up) according to the procedure below:
    a. unlocking of the caissons with respect to the plates,
    b. raising of the caissons (with or without floats-ramps),
    c. folding up of the ramps (if end vehicle),
    d. pivoting of the caissons (with or without the floats-ramps) to the position parallel to the body (position in folded up mode),
    e. reverse translation of the floats-ramps and possible connection on the caissons,
19. exit of the vehicles on the opposite bank.

So that the vehicle of the invention can be deployed according to the different possibilities offered by it, it can also have at least one of the characteristics hereafter, considered alone or in any technically possible combination:

the deployment device includes a central pivot having a lifting jack supported on the rolling base and one telescopic guiding leg per group of elements to be pivoted, each of these telescopic legs serving as vertical pivot shaft for a group of elements;

the deployment device includes attachment plates which can be inclined from a roughly vertical position and which make it possible to fix the groups of elements in their deployed position;

the vehicle has some first means which, when the vehicle is in folded up configuration, make it possible, in each group of elements, to distance the caissons from the other elements according to a direction roughly parallel to the longitudinal axis of the rolling base;

the deployment device includes some second means configured so as to make possible a deployment of the ramps with respect to the floats with an increasing stepping down effect of the load of deployment as the deployment of the ramps progresses;

the vehicle includes some first locking means making it possible to lock the different elements in their deployed position as well as in their folded up position;

the vehicle includes some second locking means making it possible to lock it with another vehicle of the same design during the production of a ferry or a bridge, the second locking means being configured so as to allow locking between two vehicles regardless of the deployment configuration of each of the vehicles;

according to a first deployment configuration, each of the four groups of elements consists of a caisson;

according to a second deployment configuration, two groups of elements both consist of a caisson and the other two groups of elements both consist of a caisson, a float and a ramp;

according to a third deployment configuration, each of the four groups of elements consists of a caisson, a float and a ramp.

The different configurations of a vehicle according to the invention can be summarized in the following manner, a more detailed description being given below in reference to the drawings.

In road transport mode, that is to say when the vehicle of the invention is to travel on land, the caissons, floats and ramps are arranged in such a way as to form four groups arranged around a central pivot, in two by two groups, each group of which contains, starting from the central pivot respectively towards the front and towards the rear of the rolling base, a caisson followed by the superposition of a float and a ramp. While the caisson and the corresponding float are attached to one another in a removable manner, the caisson is attached to the central pivot by means of a shaft around which it can pivot 90° from its front or rear position to a lateral or transverse position.

The movement of the vehicle in the water is ensured by two aquatic propellers, for example, centrifugal pumps.

When the vehicle of the invention is used alone to form a ferry or a floating bridge, all the elements, that is to say the caissons, floats and ramps, are deployed. For a vehicle which is to be transported boarding perpendicularly with respect to the body-cabin assembly of the rolling base, the specified loading length is equal to the width of the body. For longer vehicles to be transported, the mechanism for inclination of the caissons floats-ramps is capable of raising the caissons-floats-ramps assembly and the load supported by them.

When two or more vehicles of the invention are coupled to form a multivehicle ferry or floating bridge, each of the vehicles can be deployed entirely, just as it is possible to deploy each just partially, in particular in an asymmetrical manner.

Thus, two vehicles of the invention can form a ferry with a heavy tracked vehicle capacity while having the same navigation performance capacities as a single-vehicle ferry. In order to form this ferry, the two or more vehicles are deployed entirely with the exception of the ramps situated facing the neighboring vehicle. The vehicles are connected by the interface provided on the floats or by the interface provided on the caissons depending on the degree of deployment of the floats and the caissons of the coupled vehicles. In long connection, the vehicles are connected by the interface of the floats, whereas in short connection, the connection occurs by the caisson interface. In the ferry version, the coupled vehicles are each propelled by aquatic engines so that all of the coupled vehicles can navigate at the maximum speeds in any direction. In the case of three amphibious vehicles with configurations capable of transporting a heavy wheeled vehicle, the two end vehicles are deployed long, and the middle vehicle is deployed short.

With regard to the configuration as floating bridge, the coupled vehicles, deployed long, short or semi-short, can form a central bridge module, so as to cover the whole width of a wet gap, with use of two vehicles as end module deployed long or semi-short with the ramps deployed on the side of the banks. The different possibilities for deployment of the vehicles according to the invention give the floating bridge the ability to cover any gap widths starting from 23 meters, the minimum increment being less than the amplitude of overlapping of the ramps on the banks.

BRIEF DESCRIPTION OF DRAWING FIGURES

Figure 2:
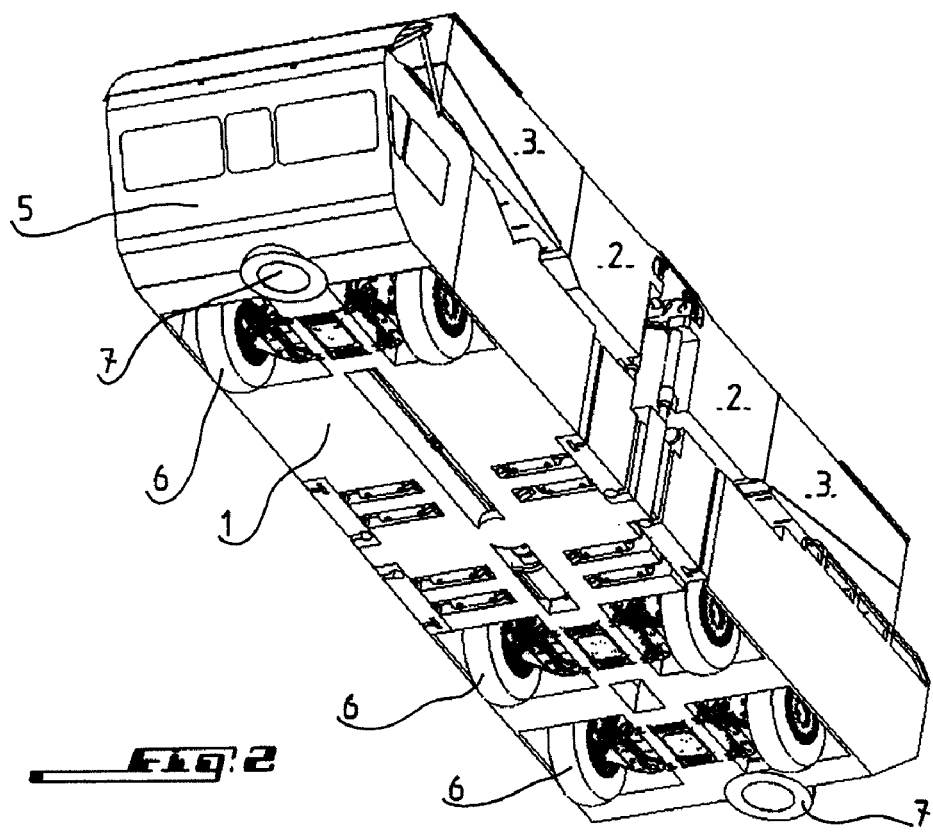
Figure 3:
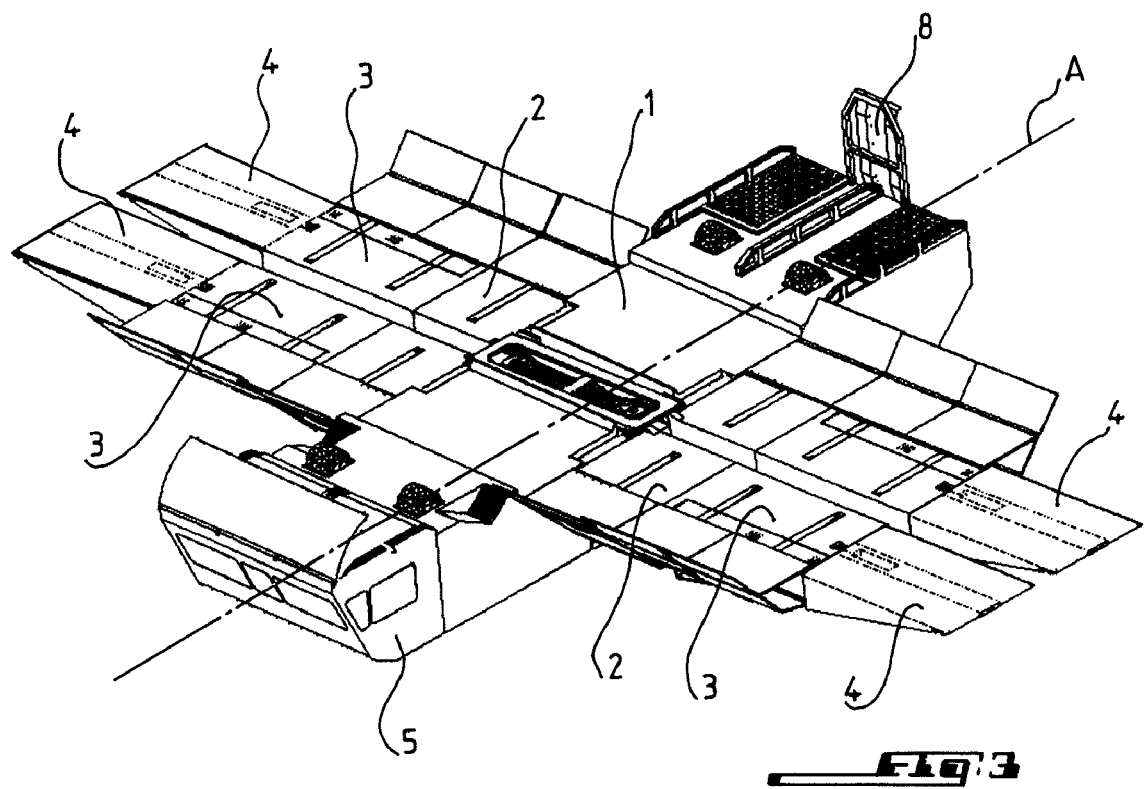
Figure 4:
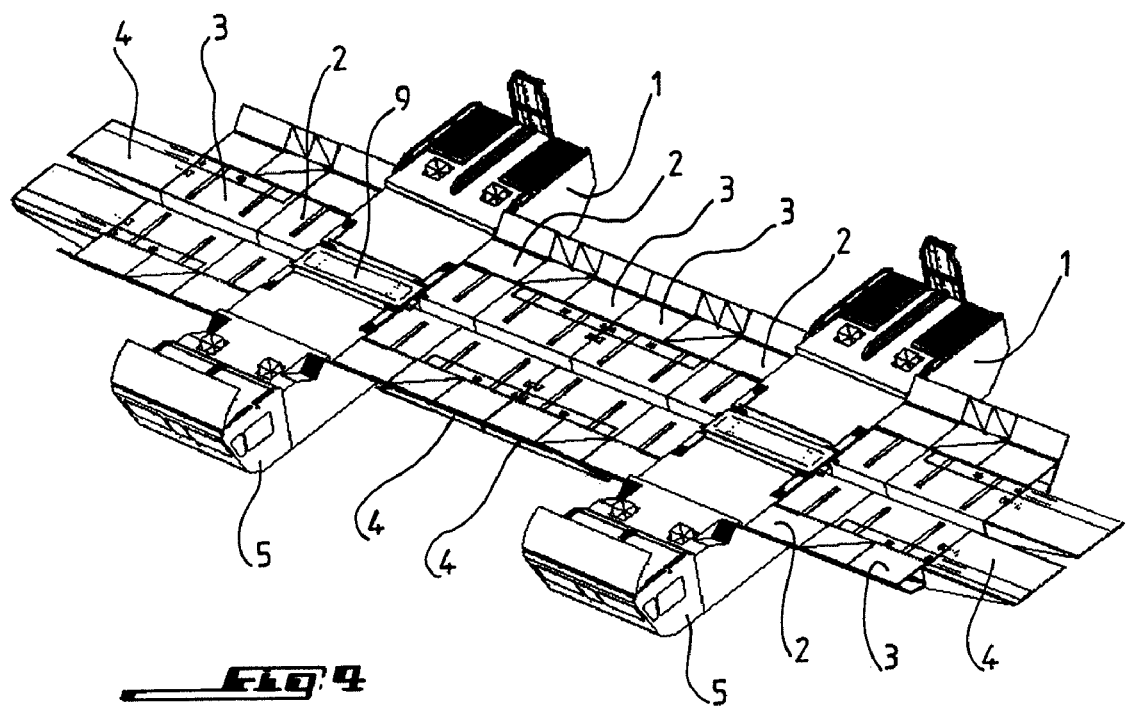
Figure 5:
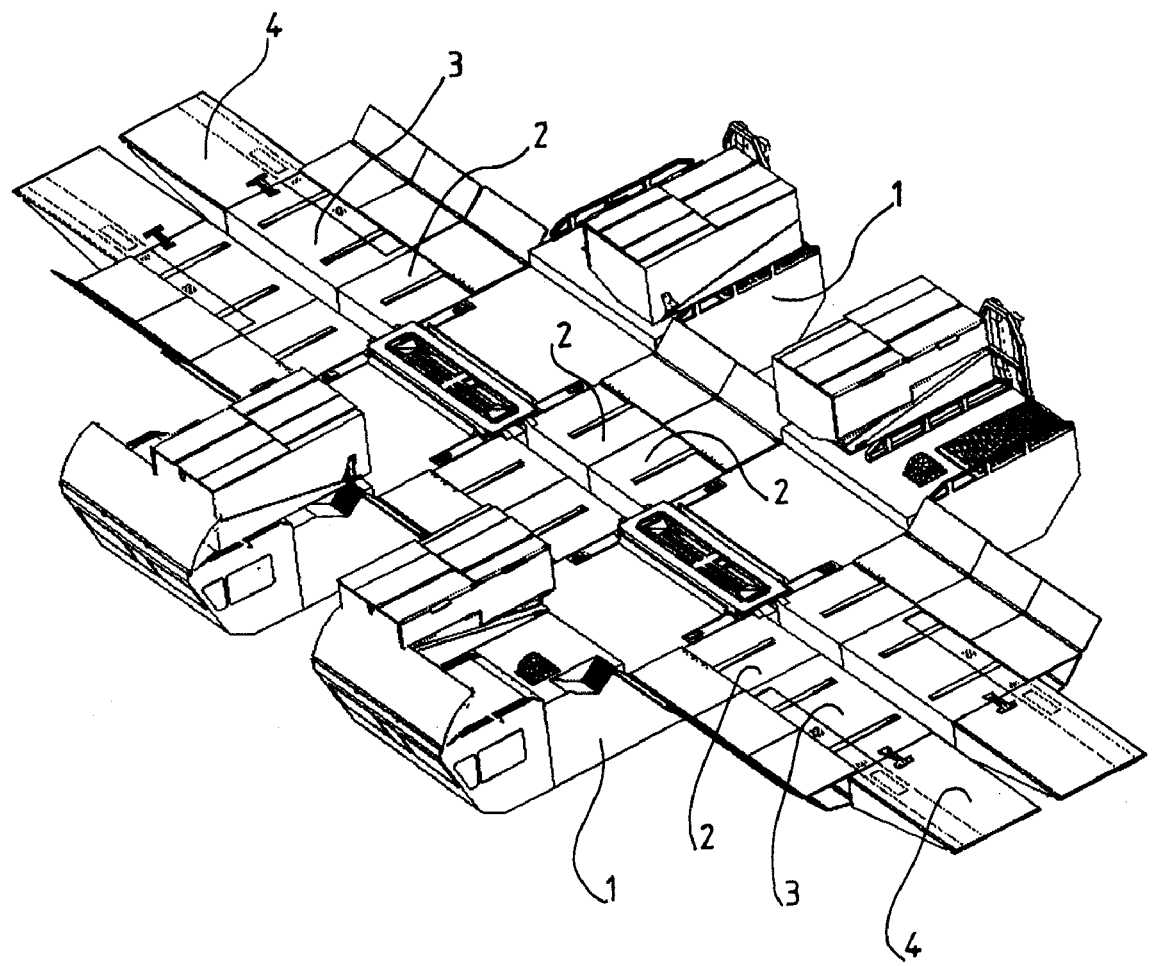
Figure 13D:
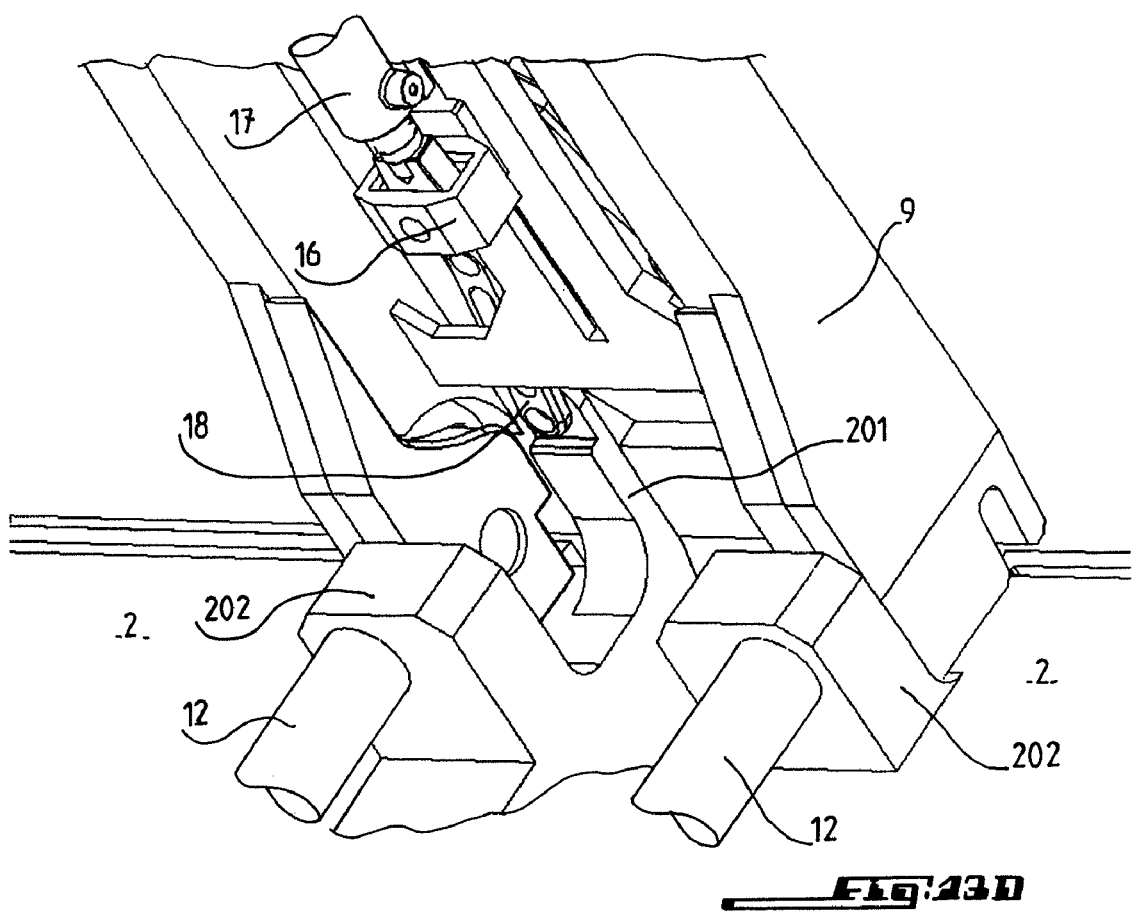
Figure 14:
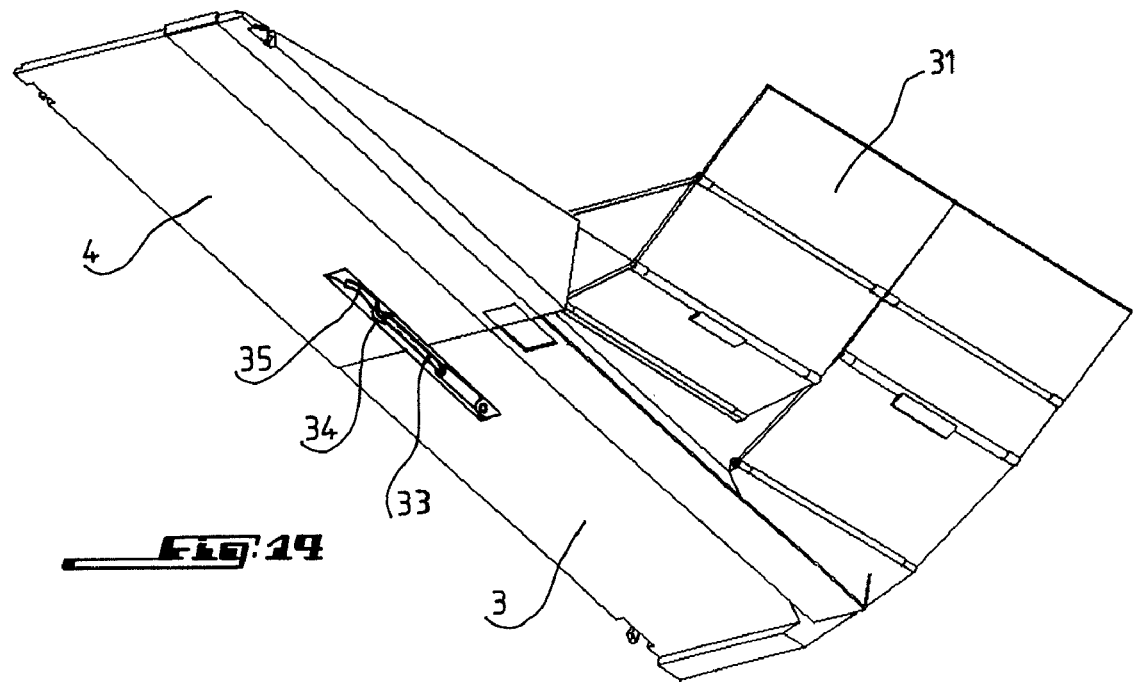
Figure 28A:
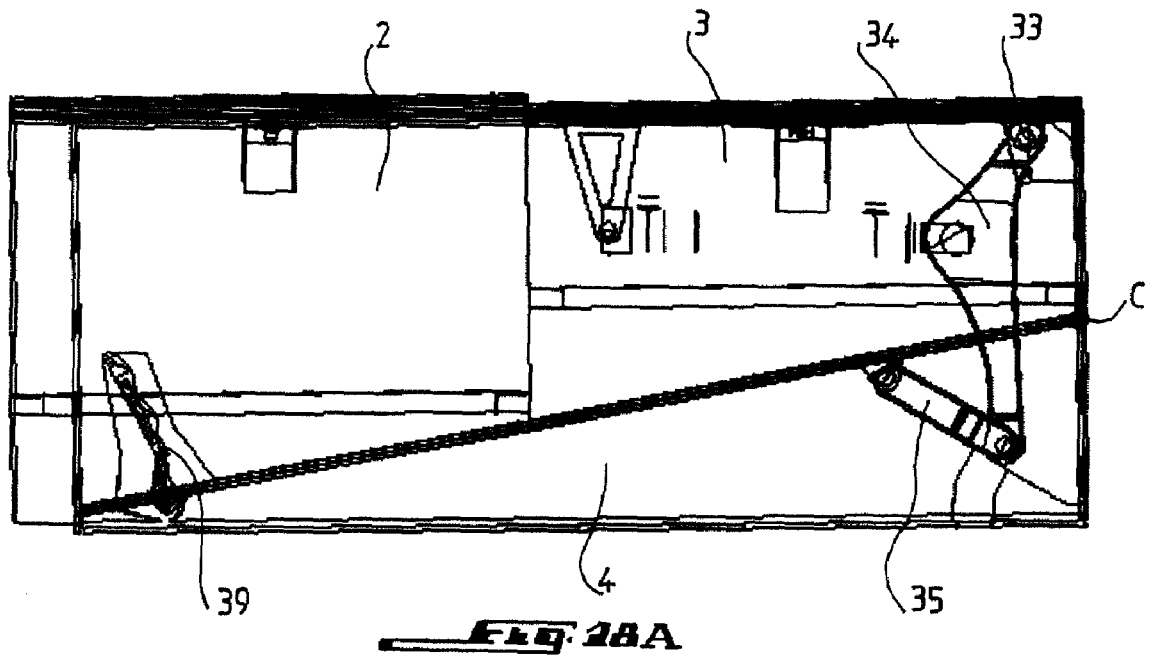
Figure 28B:
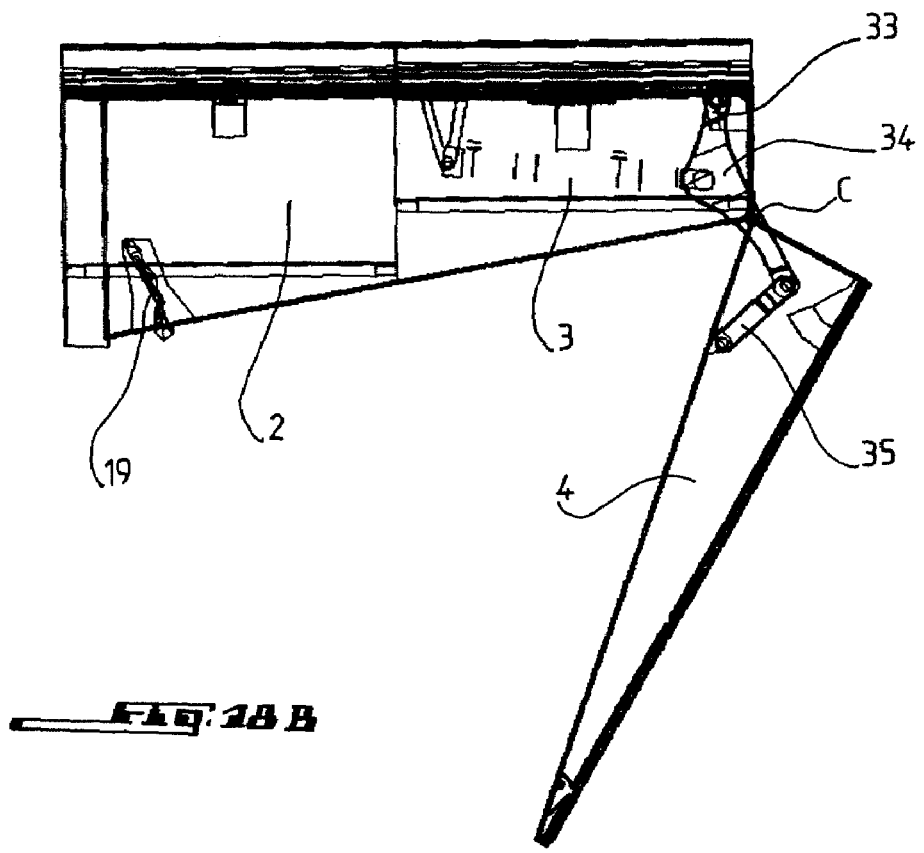
Figure 18:
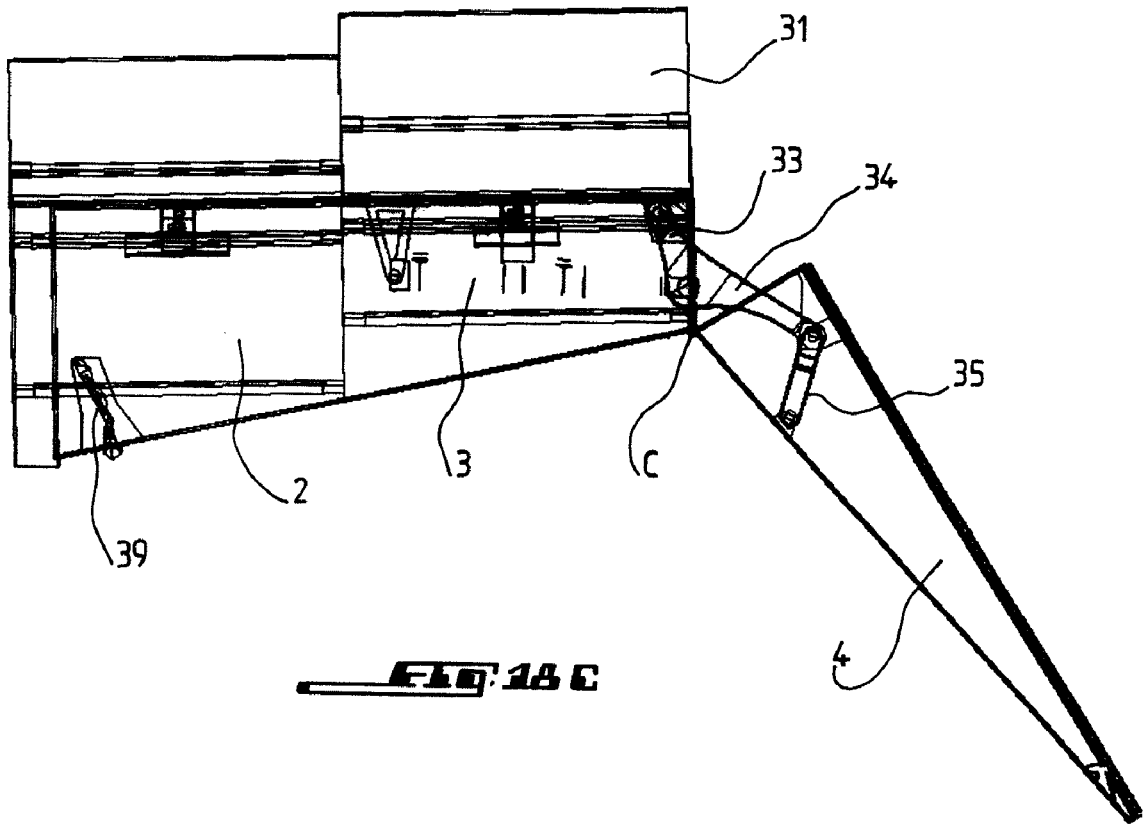
Figure 18:
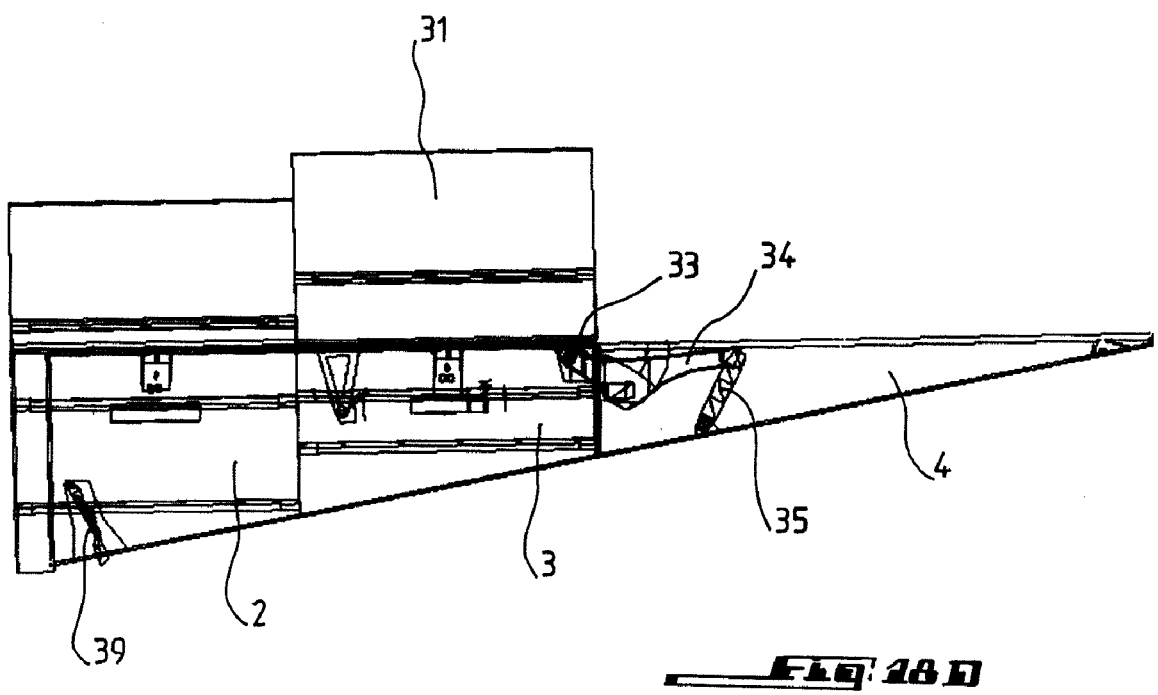
Figure 49:
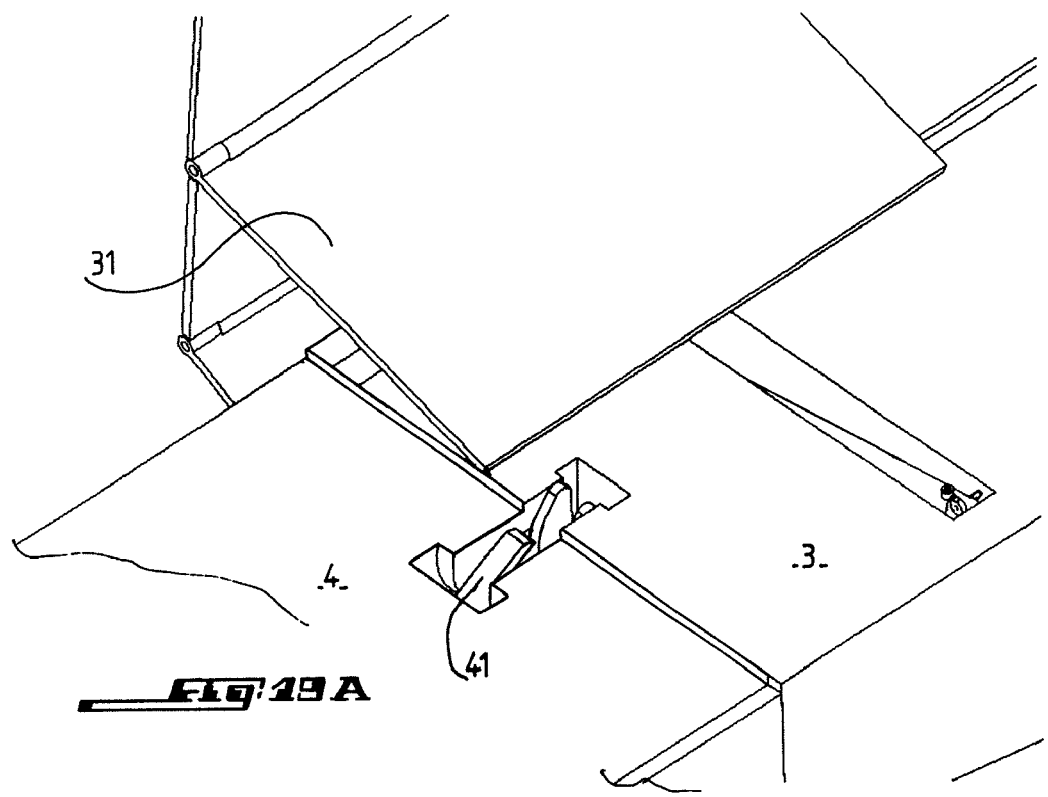
Figure 49:
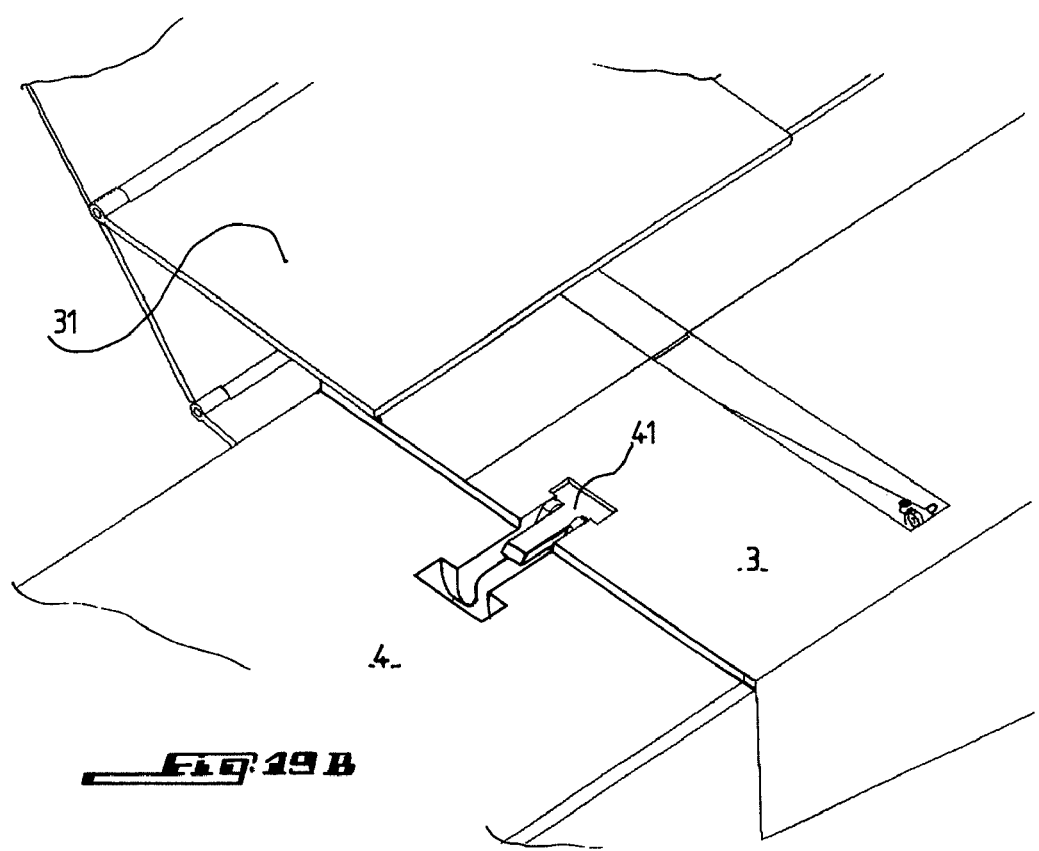
Figure 20A:
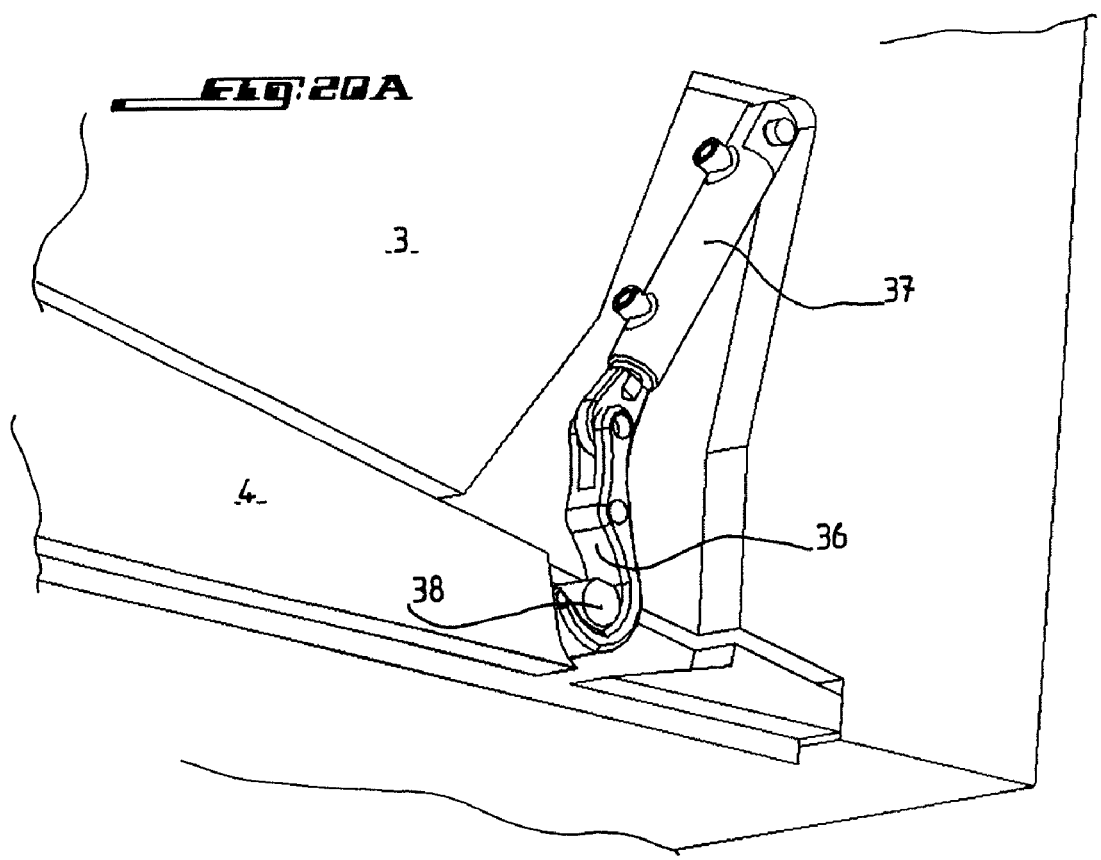
Figure 20B:
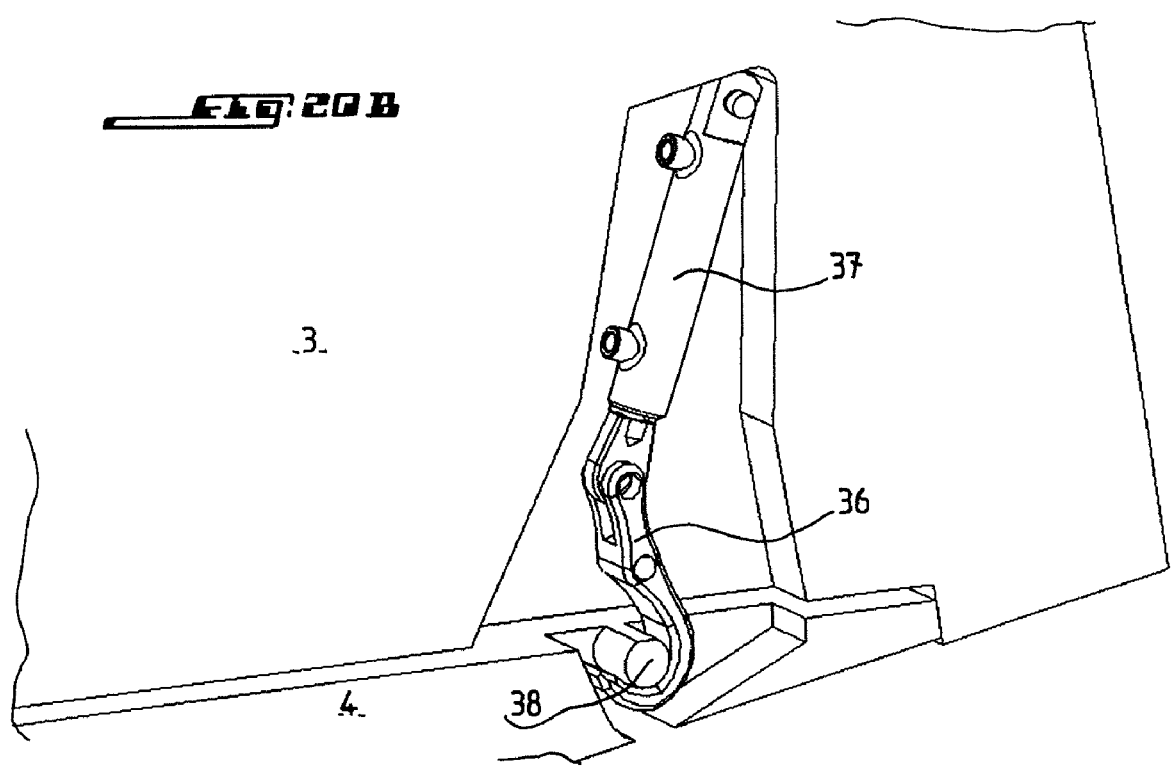
Figure 20E:
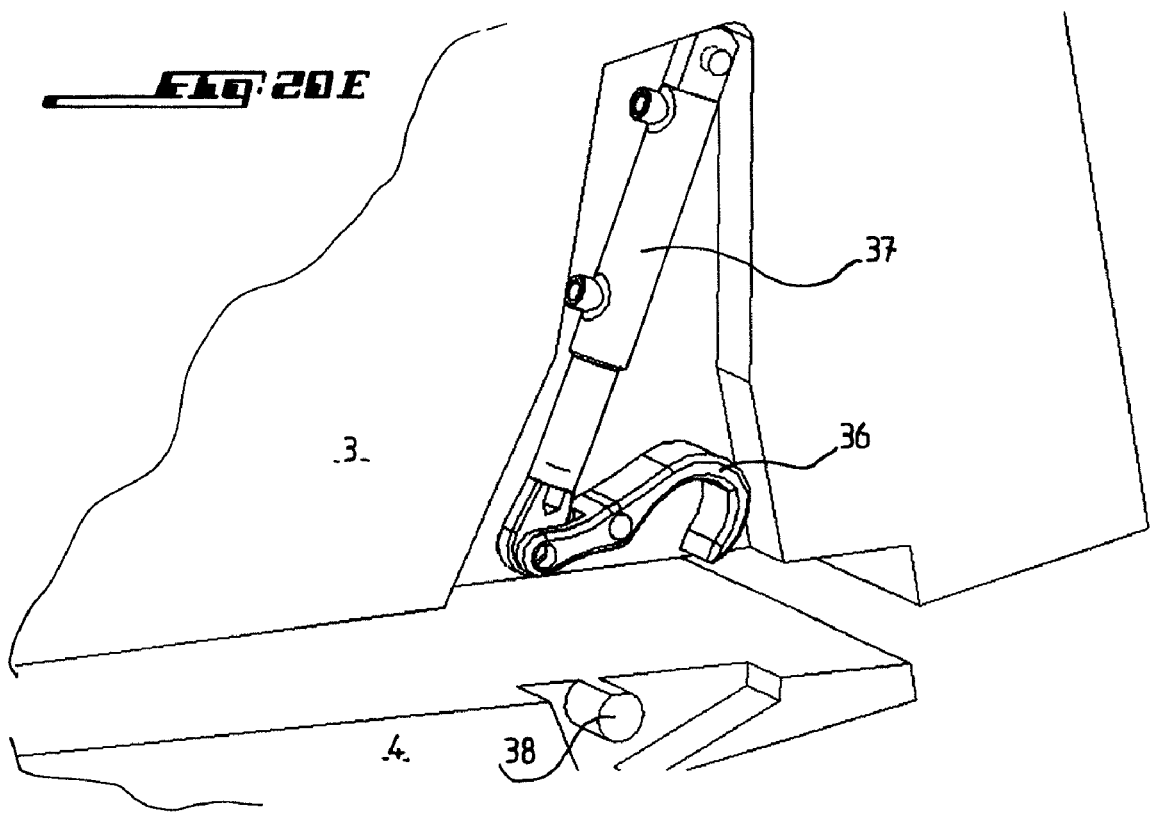
Figure 21A:
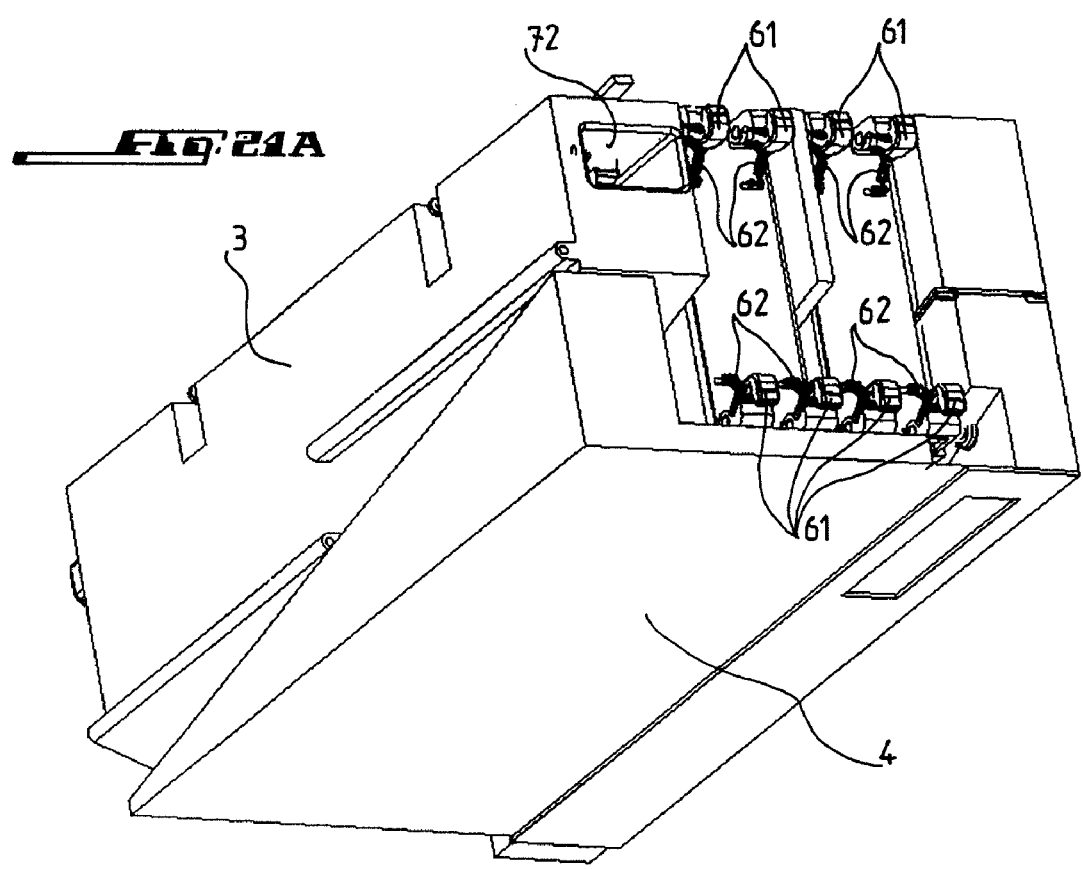
Figure 23A:
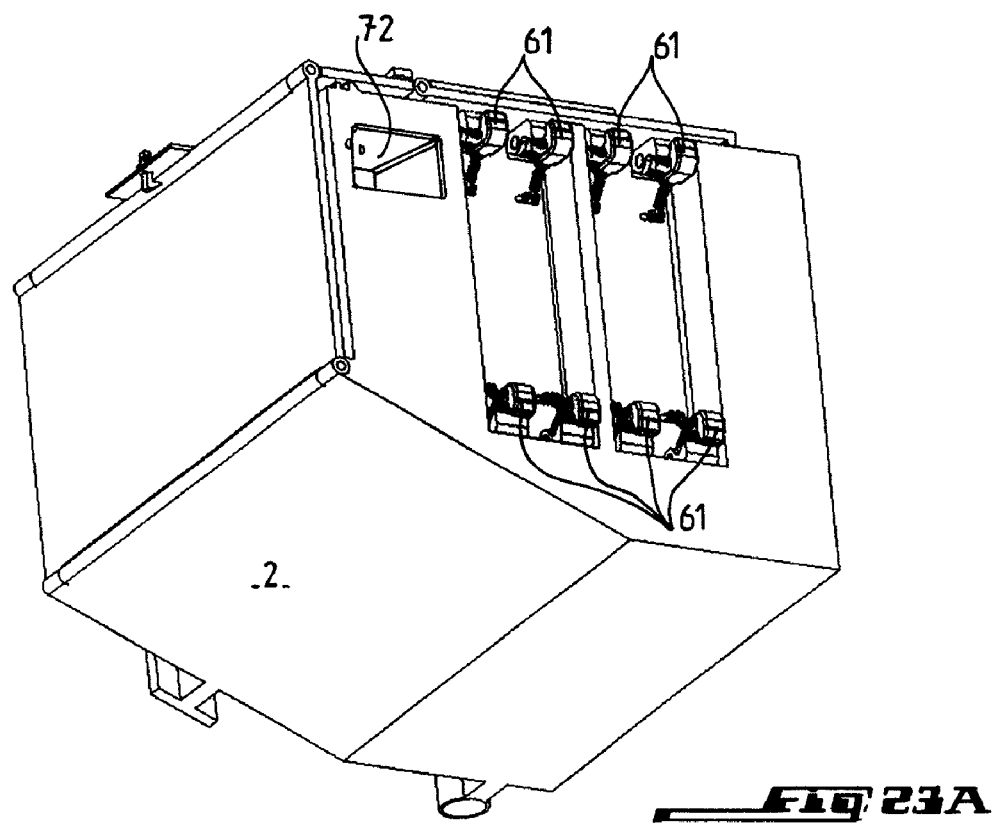
Figure 23B:
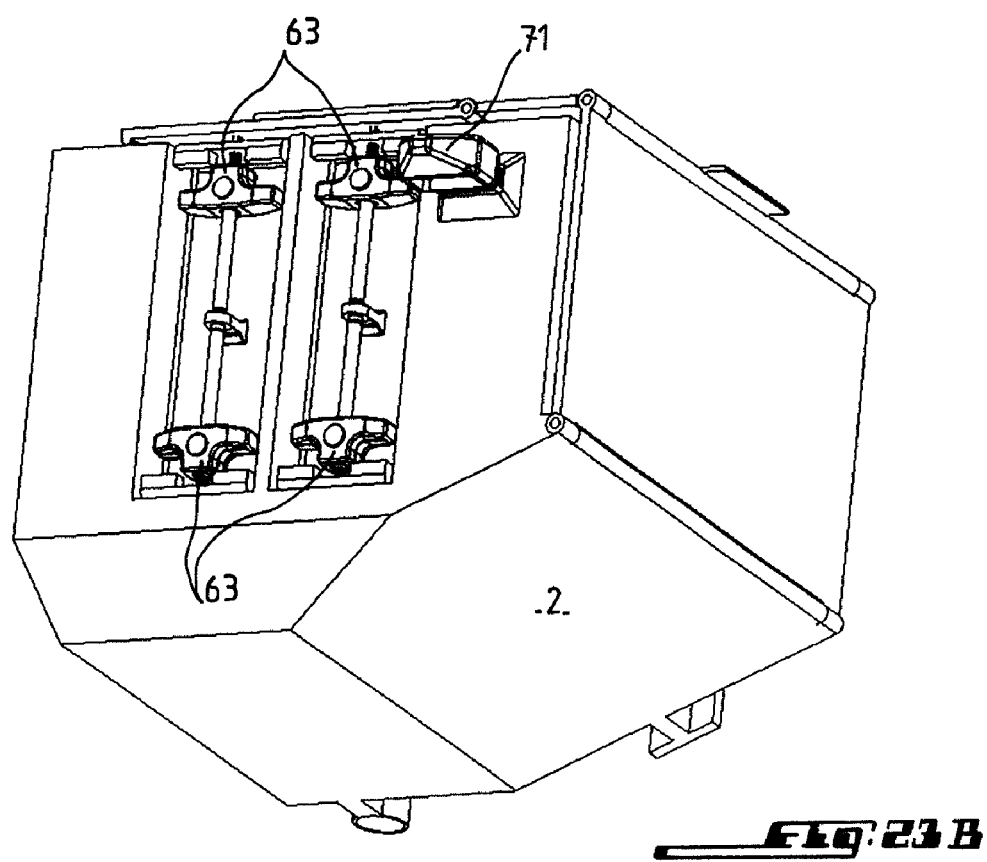

Other characteristics and advantages of the present invention will emerge from the description hereafter of an embodiment of the invention and its variants, the description being given in reference to the appended drawings in which:

FIG. 1 diagrammatically represents in perspective an amphibious vehicle according to a preferred embodiment of the invention, FIG. 2 represents the vehicle of FIG. 1 in the form of a view from beneath the frame of the vehicle, FIG. 3 represents the vehicle of FIG. 1 entirely deployed, FIG. 4 represents a first combination of two vehicles of the invention forming a ferry, FIG. 5 represents a second combination of two vehicles forming a short ferry, FIGS. 6A to 6F represent the main steps of deployment of a vehicle of the invention in short deployment mode, FIGS. 7A to 7F represent a vehicle of the invention in semi-short deployment mode, FIGS. 8A to 8E represent the main steps of deployment of a vehicle of the invention in long deployment mode, FIGS. 9A to 9D represent the main phases of deployment of a caisson by means of the deployment device of a vehicle according to the invention, FIG. 10 represents a deployment device according to the invention, FIG. 11 represents a detail of the device of FIG. 10, FIGS. 12A to 12D represent in detail the pivoting of two caissons by means of the deployment device of an amphibious vehicle according to the invention, FIGS. 13A to 13D represent the different phases of locking of deployed caissons, FIG. 14 diagrammatically represents the mechanism for deployment of the ramps, FIGS. 15 and 16 represent the caissons-floats-ramps assembly respectively in folded up configuration and in deployed configuration, FIG. 17 represents a detail of the principle of deployment of the ramp of a vehicle of the invention, FIGS. 18A to 18D represent, in four steps, the deployment of a ramp with respect to the floats on which it is articulated, FIGS. 19A and 19B represent the principle of locking of a ramp with respect to a float on which it is articulated, FIGS. 20A to 20E represent, in five steps, the movements of a mechanism for locking the ramp in folded up position, FIGS. 21A, 21B, and in more detail, FIGS. 22A and 22B, represent an inter-vehicle connection system arranged on the floats of a vehicle according to the invention, FIGS. 23A and 23B respectively represent male locking means and female locking means arranged on caissons of a vehicle according to the invention, and FIG. 24 represents mechanical means intended for facilitating the translation movements of the floats on the rolling base of a vehicle according to the invention.

DETAILED DESCRIPTION

As shown by FIGS. 1 and 2 respectively in the form of a perspective view from above and in the form of a perspective view from below, an amphibious vehicle according to the invention has, arranged on self-propelled rolling base 1, elements such as caissons 2, floats 3 and ramps 4, these elements being arranged some at least partially over the others and according to an orientation essentially parallel to longitudinal axis A of rolling base 1, when the vehicle is in a folded up configuration for movement on land. The elements are configured so that they can be deployed in such a way as to form a track or bridge portion oriented transversely with respect to longitudinal axis A of rolling base 1, when the vehicle, alone or with another vehicle of the same design, is supposed to form a floating bridge or a ferry.

The main structure of rolling base 1 of the vehicle of the invention consists of a sealed self-supporting body preferably made of aluminum and a cabin connected with the structure of the body. The cabin can accommodate three people, with the knowledge that two people are sufficient for all the operations for control of the vehicle of the invention. Exceptionally, even a single person can be sufficient for performing all the controls necessary for manipulation of the vehicle. Exit of the occupants from the cabin in the water takes place through the roof, where the space and visibility are sufficient for implementation of the ferry or ferries or of a floating bridge using one or more vehicles according to the invention.

Rolling base 1 is motorized by a thermal engine arranged in rear central position. The mechanical energy is transmitted by an engine unit to the axles via a mechanical transmission chain comprising shafts and cardan drives of which a transfer part mounted in central position distributes the torque according to the motivity information coming from each wheel. In the version represented in FIGS. 1 and 2, the vehicle has three axles with independent wheels and integral 6 by 6 transmission with the six wheels guiding. The suspensions are of pneumo-oil type with superposed double triangle, and the braking system is integrated in the rim of each wheel in the form of a hydraulic system. The steering is power-assisted and controlled from a primary box under the control of the main controls and transmitted to the rear axles via a mechanical transmission by shafts and control bars.

The aquatic propulsion is ensured, for example, by two systems of the centrifugal pump type, directly engaged on the engine by a power take-off and by the intermediary of shafts and cardan drives. The cooling system is of the closed circuit ventilated air/water exchanger type when the radiators are positioned on the body of the rolling base in the rear part. The exhaust is situated at the rear end of the body, and the pipes extend above the body in order to prevent immersion. The air intake occurs through manifolds situated in front of the body and transmitted to an air box situated near the engine unit.

The elements configured and arranged for being deployed in order to form a running track or a parking surface for a vehicle or a storage surface for equipment are arranged in the form of four essentially equal groups of elements, each of which is arranged and mounted on rolling base 1 in such a way as to constitute a folded position from which the elements of each of the four groups can be deployed in order to obtain at least three different floating bridge or ferry configurations.

Thus, on frame 1 in the form of a sealed body, the amphibious vehicle of the invention has three axles 6 with a total of six independent guiding wheels with integral transmission and driven by a thermal engine. The thermal engine also provides mechanical energy to two aquatic propellers 7. The vehicle itself and the deployment and folding up of the different elements forming a floating bridge or a ferry are controlled from cabin 5 arranged on one of the two opposite ends of body 1.

The four groups of elements, each of which includes caisson 2, float 3 and ramp 4, are mounted on body 1 by means of central pivot 9 configured so that it can pivot each of the groups of elements between the folded up position and a deployed position and vice versa. The four caissons 2 are arranged on either side of central pivot 9, that is to say two caissons are arranged on the side of central pivot oriented towards the front of the vehicle, and the other two caissons are arranged on the side of the central pivot oriented towards the rear of the vehicle. The two front caissons and the two rear caissons are mounted so as to pivot on central pivot 9 with the exterior corners facing one another respectively of the two front and rear caissons on the right and of the two front and rear caissons on the left. This arrangement will be explained in more detail in the text below.

FIG. 3 represents a vehicle of the invention entirely deployed, by itself forming a floating bridge or a ferry. In this configuration, the four caissons 2, the four floats 3 and the four ramps 4 are entirely deployed and form a running track oriented transversely with respect to longitudinal axis A of body 1 of the vehicle. This figure also shows raised exhaust 8 for preventing any immersion. FIG. 3 furthermore shows that caissons 2 and floats 3 can have means making it possible to widen the running track and means for lateral heightening, technical characteristics which are particularly advantageous as a compromise between the constraints of a maximum width for road travel and a larger width resulting in better floating behavior for use on the water.

It should be noted that in FIG. 3 and following, when the vehicle of the invention is shown whole, it is represented without axles 6 and the road and aquatic propulsion elements.

FIG. 4 shows a combination of two vehicles of the invention for forming a long ferry. According to this configuration, the elements of the two vehicles of the invention are deployed entirely on the sides forming the ends of the two-vehicle ferry, whereas on the two sides facing one another, only caissons 2 and floats 3 are deployed, with ramps 4 remaining folded up.

FIG. 5 represents the combination of two vehicles of the invention in a shorter configuration than that represented in FIG. 4. This short configuration is obtained by deploying on the two vehicles only the two sides which respectively form the right end and the left end of the bridge or ferry, whereas on the two sides of the two vehicles facing one another, only caissons 2 are deployed.

The two floating bridge or ferry configurations represented in FIGS. 4 and 5 are only given as examples, since it goes without saying that it is possible to combine more than just two of the vehicles of the invention and that the mode of deployment of each of the vehicles used in this combination depends on the total length of the floating bridge or ferry to be obtained. The only set prescriptions in this sense are that on each of the combined vehicles, at least the four caissons 2 are deployed, and on the two head or end vehicles, the caisson 2, float 3 and ramp 4 elements are quasi-routinely deployed entirely because the ramps facilitate access to and also departure from the bridge or ferry, and the float-plus-ramp assembly can be varied in terms of inclination in order to obtain the best possible adaptation to the banks. For the vehicles in intermediate position, the deployment of caisson 2 or of caisson 2 and float 3 depends on the length of the bridge of the ferry to be obtained. In any case, on these intermediate vehicles, the ramps are not deployed.

In order to be able to fulfill the different functions for which the amphibious vehicle of the invention is designed, the elements configured so that they can form a running track or a parking or storage surface can be deployed in different manners which nevertheless can be summarized in the three basic configurations represented by a few steps of their deployment respectively in FIGS. 6A to 6F, 7A to 7F and 8A to 8E.

When it is a matter of obtaining a floating bridge or ferry element with short deployment, only caissons 2 are deployed. To this effect, in a first step represented in FIG. 6A, the float 3 and ramp 4 sub-assemblies are separated by translation from the corresponding caissons 2. This is represented by the four arrows, two of which are oriented in the front direction and the other two of which are oriented in the rear direction with respect to the forward running direction of the vehicle of the invention. This movement is necessary in order to create a sufficiently large empty space so that caissons 2 can pivot as represented as the next step in FIG. 6B.

Figure 6C:
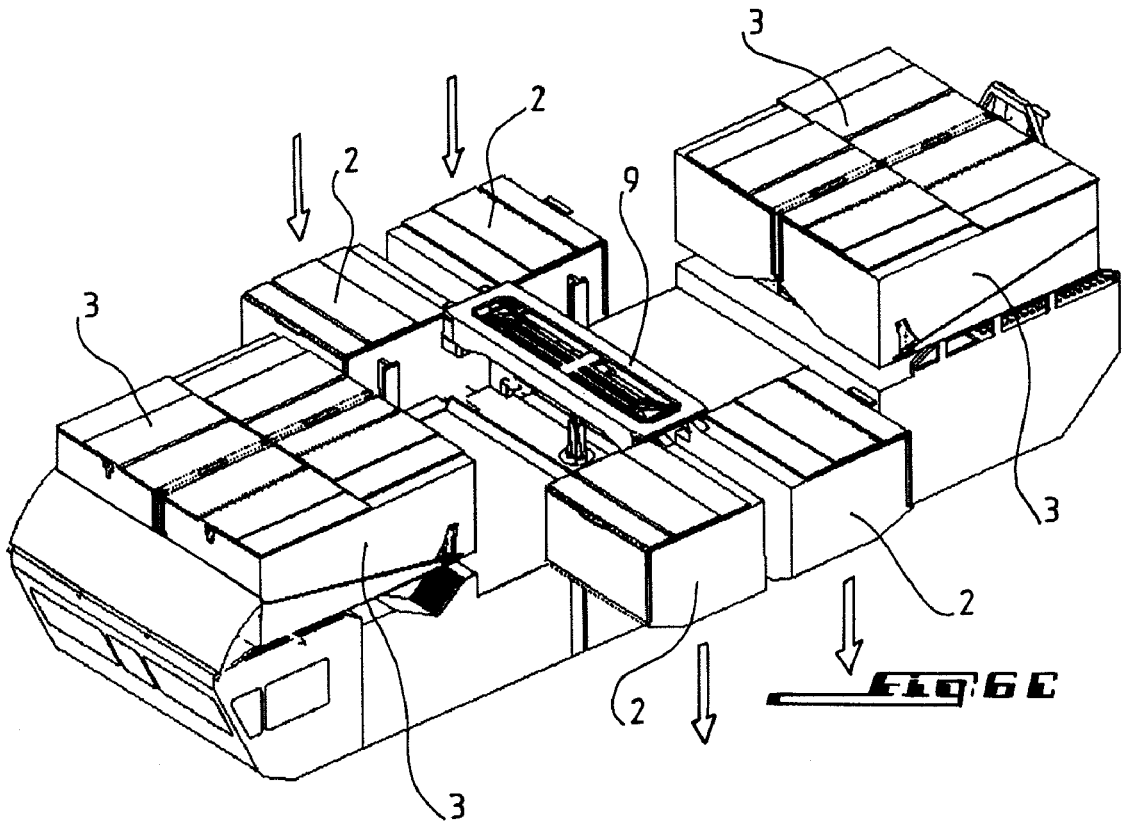
Figure 6D:
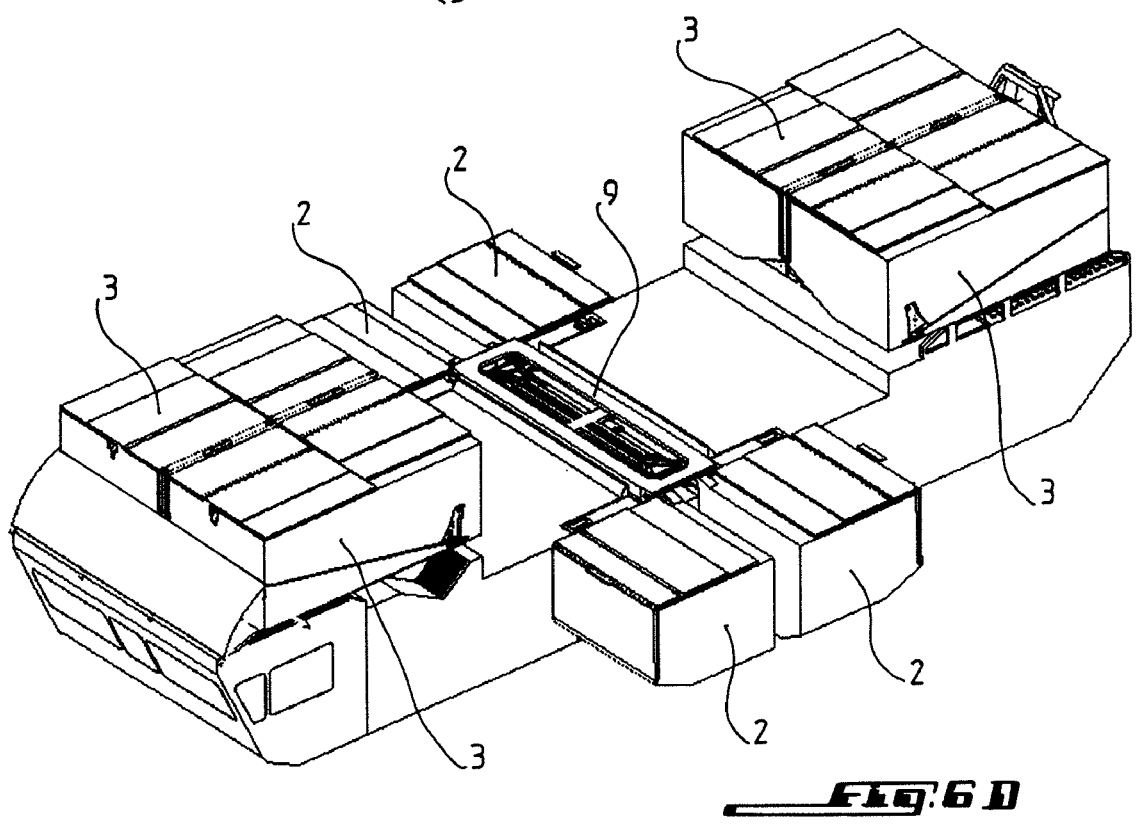

In FIG. 6B, the four caissons 2 are represented in an intermediate position between the folded up position and the entirely deployed position. The pivoting of caissons 2 is finished, as represented in FIG. 6C, after pivoting 90°, that is when caissons 2 are oriented transversely with respect to the longitudinal axis of the vehicle. Then, all four caissons 2 and central pivot 9 are lowered from their raised position to a position of use. Once this position is reached, for the embodiment represented here, the width of the track of the upper surface of the four caissons 2 is widened as represented in FIGS. 6E, 6F.

In order to obtain a floating bridge or ferry element with semi-short deployment, the deployment of the different elements is that which is represented in FIGS. 7A to 7F. In a first step, the two float 3 and ramp 4 sub-assemblies arranged on one side of the vehicle are moved by translation in order to move away from the corresponding caissons 2. On the other side, that is to say on the side on which the elements are to be deployed entirely, caissons 2 and the corresponding float 3 and ramp 4 sub-assemblies are left together.

In the next step represented in FIG. 7B, the two caissons 2 of one side and the two caisson 2-float 3-ramp 4 assemblies are turned 90° in opposite directions in order to reach the position at the end of pivoting represented in FIG. 7C. After the end of pivoting, the two caissons 2 and the two caisson-float-ramp assemblies are lowered into the position of use represented in FIG. 7D. Then, ramps 4 are deployed (FIG. 7E), and the means for widening the track are actuated as represented in FIG. 7F.

Figure 8D:
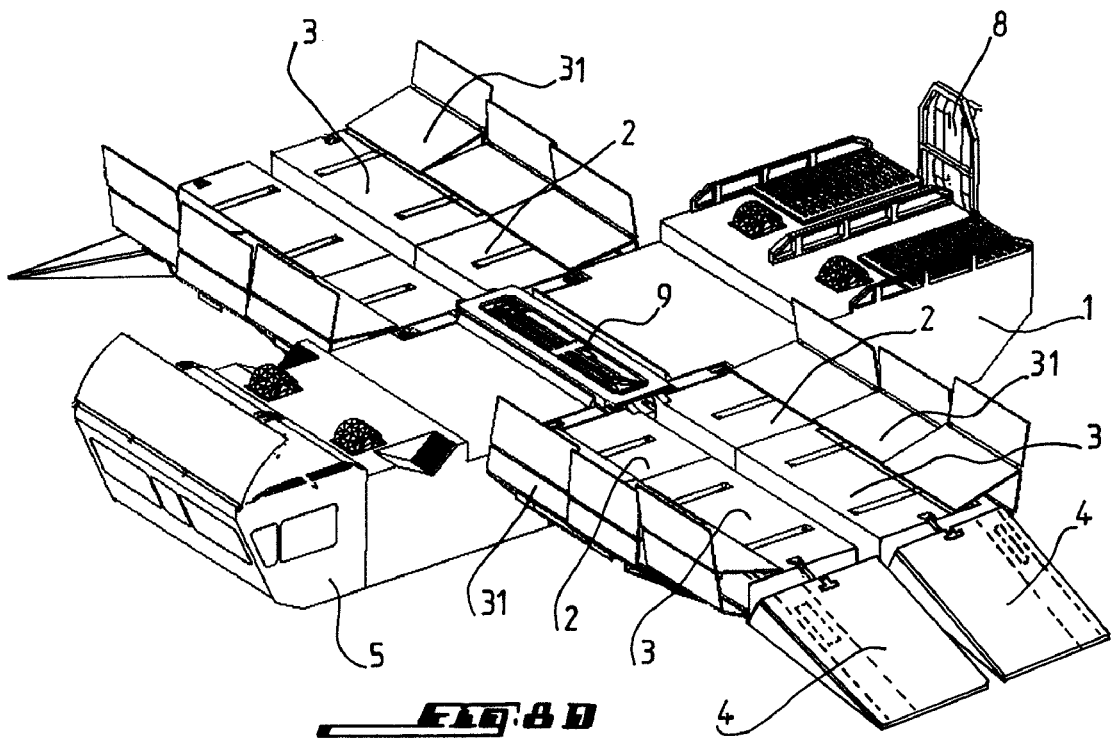
Figure 8E:
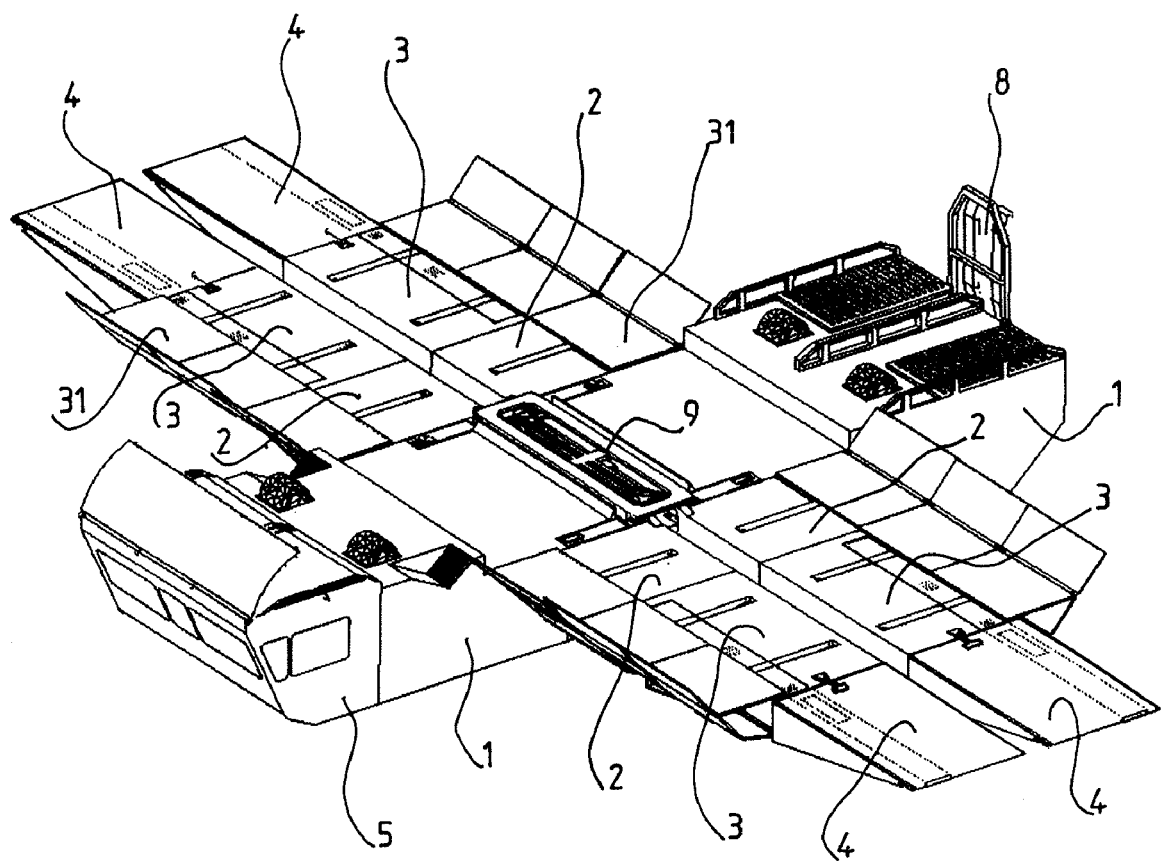
Figure 42D:
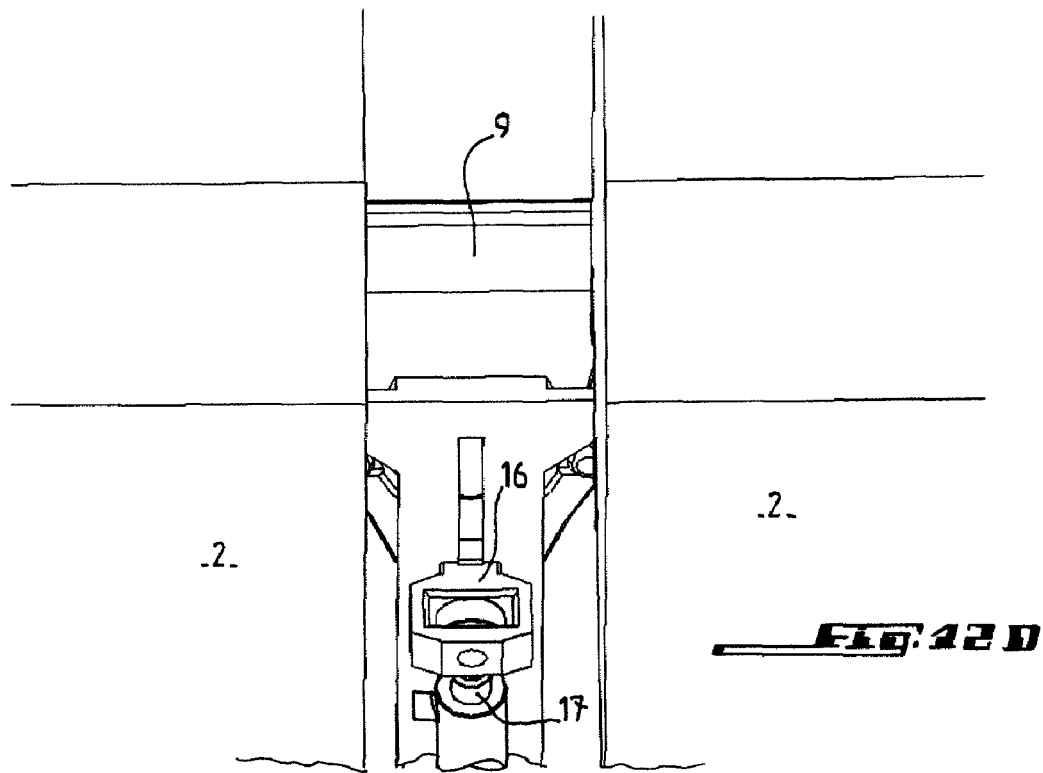
Figure 43A:
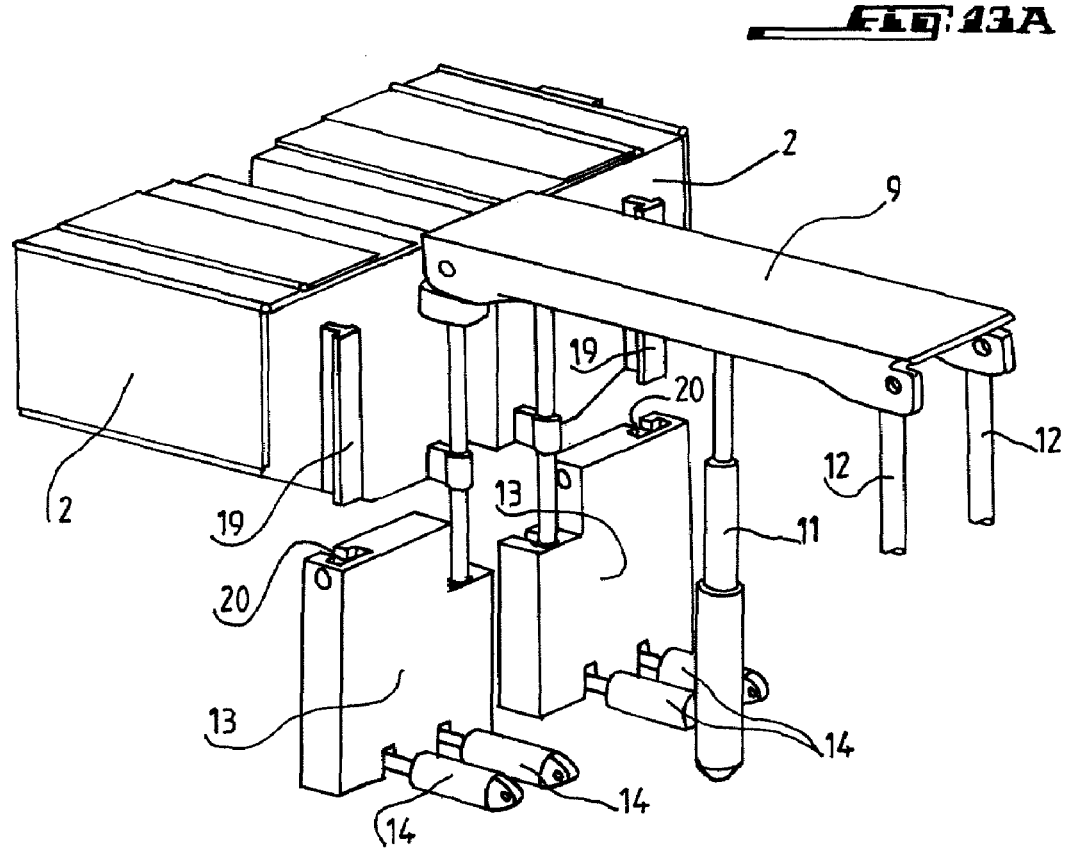
Figure 43B:
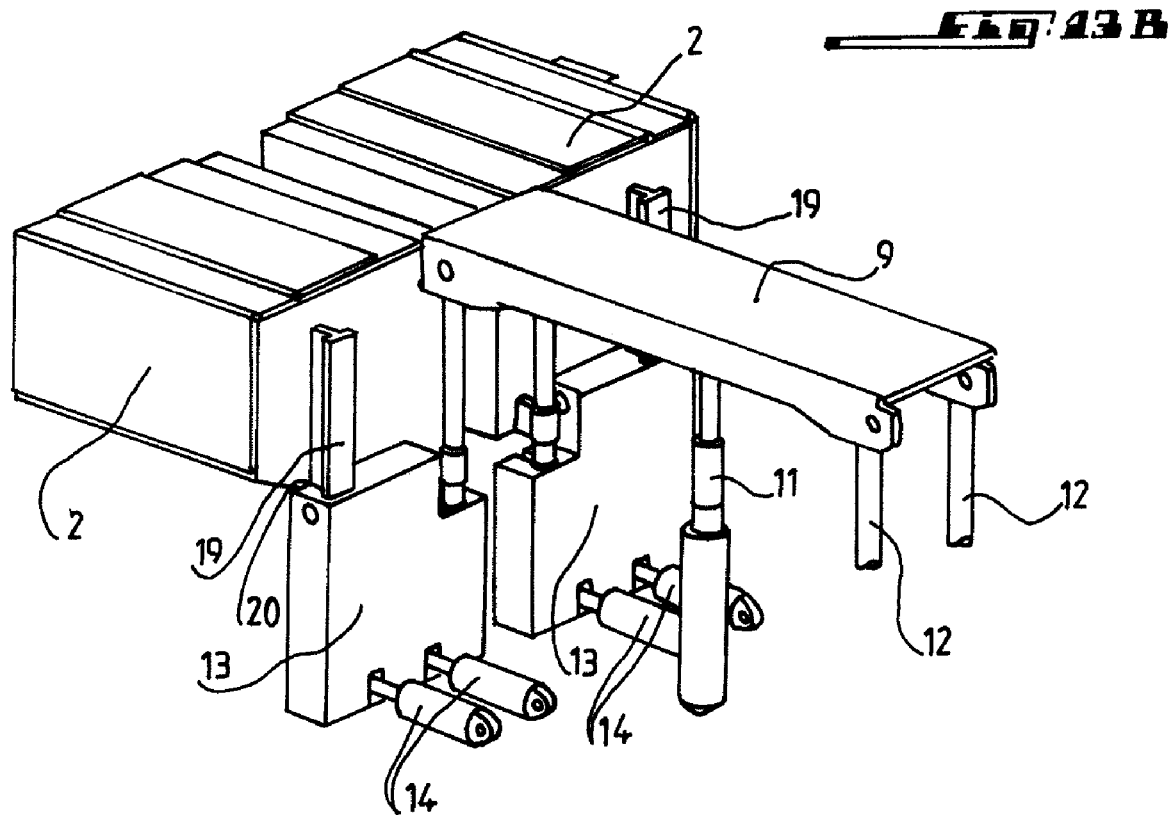
Figure 43C:
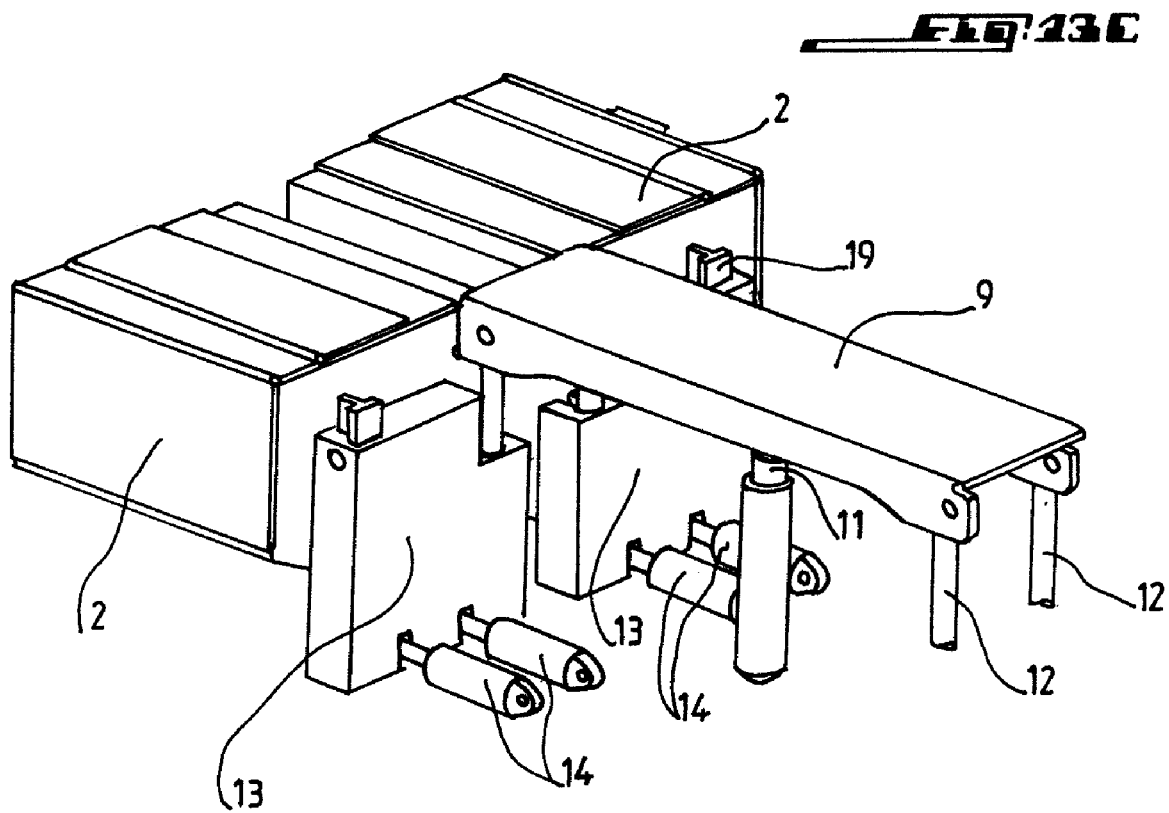

In order to obtain a floating bridge or ferry element with long deployment, it is not appropriate to proceed to distance, by translation, all or part of the float 3, ramp 4 sub-assemblies from the corresponding caissons 2, but rather, as represented in FIG. 8A, one proceeds immediately to pivot the four caisson 2-float 3-ramp 4 assemblies 90° in order to obtain their transverse position with respect to longitudinal axis A of the vehicle, as represented in FIG. 8B. After pivoting 90°, the four caisson 2-float 3-ramp 4 assemblies are lowered into their position of use, and ramps 4 are deployed, as represented in FIG. 8D, in order to obtain the final deployment as represented in FIG. 8E.

The deployment of the caisson 2, float 3 and ramp 4 elements explained in the preceding is implemented by means of deployment device 10 which essentially entails three groups of means, the first being central pivot 9 mounted supported on body 1 by means of hydraulic lifting jack 11, the second group formed by four telescopic guiding legs spaced from one another and around which caissons 2 pivot, and the third group including four attachment plates 13 for attachment and inclination of caissons 2, plates 13 being mounted so as to pivot with respect to body 1 around corresponding pivoting axis B. Associated with each plate 13 are two inclination jacks 14.

FIGS. 9A to 9D show the main phases of deployment of a caisson by means of the deployment device of a vehicle according to the invention, the device being represented in FIG. 10.

As shown more particularly by FIGS. 9A to 9D, each of caissons 2 is mounted so as to pivot around a corresponding telescopic leg 12. To this effect, caisson 2 has two projecting flanges 202, 203 through which telescopic leg 12 passes.

As can be seen already in FIGS. 6, 7 and 8, central pivot 9 is in high position while the four caissons 2 are in folded up position and during their pivoting towards the deployment position. This situation is represented in FIGS. 9A and 9B. Only when caissons 2, alone or with the corresponding float 3-ramp 4 sub-assemblies, have reached their positions of deployment, central pivot 9 descend with deployed caissons 2 towards the position of use, and the corresponding telescopic legs 12 contract. When caisson 2 has reached its level of use, central pivot 9 is also in its lowest position with respect to caisson 1, and lifting jack 11 and the four telescopic legs 12 are entirely in.

It seems important to stress here that during the deployment of the elements of the vehicle of the invention, and similarly during the folding up of these elements, central pivot 9 remains in its one position, with the exception of the changing of level. This is easily understood if, with the help of FIGS. 10 and 11 as well as the sequence of FIGS. 12A to 12D, one looks at the different arrangements on central pivot 9 thanks to which the pivoting of caissons 2 is actuated. In effect, as can be glimpsed in FIG. 10 and as shown in more detail in FIG. 11, central pivot 9 has, arranged in the lengthwise direction of the central pivot and thus transversely with respect to longitudinal axis A of the vehicle, rail 15 on which two sliders or runners 16 move by translation, each of which is actuated by pivoting jack 17, the two jacks 17 acting in opposite directions from one another. Articulated on each of runners 16 are pivoting rocker bars 18, one for each caisson 2, which are intended for transforming the translation movement of runners 16 into a pivoting movement of the corresponding caissons 2.

FIGS. 12A to 12D show a block diagram of the pivoting, from their folded up position, of two caissons 2 around the corresponding telescopic leg 12, and the change of position of the corresponding runner 16. One should note more particularly in FIG. 12A the articulation of rocker bars 18 on lever arms 201 formed on caissons 2 and arranged in such a way as to pivot around the corresponding telescopic leg 12. Runner 16 is at the beginning in exterior end position (FIG. 12A) and at the end in lower end position (FIG. 12D), when the two caissons 2 are deployed.

As shown by FIGS. 13A to 13D, when caissons 2 are in their orientation for use and therefore deployment, they are lowered together with central pivot 9 to the level of use. During this descent, which is actuated by lifting jack 11, the four telescopic guiding legs 12 on which caissons 2 are mounted so as to pivot are retracted while remaining supported on attachment plates 13. At the same time, by being lowered from the pivoting level to the level of use, the caissons become engaged, with a part in the form of a sectional shape forming male slide 19 connected with the caissons, in a groove in the form of a complementary sectional shape forming female slide 20 configured in the corresponding attachment plate 13.

When caissons 2 are locked in the corresponding attachment plates 13, the caissons, with or without the float-ramp sub-assemblies, can be inclined around the corresponding axis B in order to bring the ramp end to the height of the bank for boarding or unloading.

FIGS. 13A to 13D show the descent of caisson 2 and of central pivot 9 in four successive positions. FIG. 13A shows the caisson at the end of its pivoting but still in high position. FIG. 13B shows a first intermediate position in which caisson 2 has descended to a certain level. At this level, telescopic legs 12 stop at the end of the bore of plate 13 and begin to fold up or retract.

When central pivot 9 and caissons 2 descend, when male slide 19 of caisson 2 has linked with female slide 20, and when the whole descends, the male or interior part of the telescopic leg is stopped at the bottom of the bore of the plate and fixed with respect to the plate, and only the female part or exterior tube of the telescopic leg on which the caisson is mounted so as to pivot continues to slide in the bore.

FIG. 13C shows a second intermediate step in which caisson 2 is almost entirely lowered, and the corresponding telescopic leg 12 has retracted greatly and is fixed with respect to plate 13.

FIG. 13D, in the form of detail of FIG. 13A and in the form of a bottom view of central pivot 9, represents the pivoting assembly of two caissons 2 on their respective telescopic leg 12. Pivoting jack 17 is connected, by means of runner 16, to the two rocker bars 18, each of which is articulated on the corresponding lever arm 201. With the two caissons 2 in deployed position, their folding is obtained by a pushing movement of jack 17 on runner 16.

FIG. 14 shows the mechanism for deployment of ramps 4 which are articulated on floats 3. As can be seen, for example in FIG. 1, in folded up configuration of the vehicle of the invention, ramps 4 are folded under floats 3. As can be seen in FIGS. 7E, 7F, ramps 4 are deployed with respect to float 3 by pivoting around axis C situated transversely with respect to the longitudinal extent of float 3 and in a plane parallel to an upper or rolling surface of float 3. Each float 3 is therefore connected to the adjacent ramp 4 by appropriate means in hinge form with axis C as the pivoting axis. Float 3 is represented here with lateral shielding 31 deployed and central flooring 32 positioned for covering the space between the two adjacent floats. The pivoting of ramp 4 is obtained by acting by means of jack 33 on control bar 34 and rocker bar 35. The two sides of float 3 and ramp 4 facing one another, in the deployed state of ramp 4, are provided with a means making it possible to lock the deployed ramp with respect to the float.

FIGS. 15 and 16 show the caisson 2, float 3 and ramp 4 assembly respectively with ramp 4 folded up and with ramp 4 deployed. Likewise, FIGS. 15 and 16 show, respectively in the folded up state and in the deployed state, lateral shielding 31 with lower shield 311 and upper shield 312 as well as flooring 32.

The caisson-float-ramp assemblies constitute the running track and contribute to the floating capability of the amphibious vehicle of the invention. The caissons are the interior parts which are always deployed with implementation of a ferry or a floating bridge. They are articulated on telescopic legs 12 and engage by translation on attachment plates 13 after having been pivoted into their position of use. The floats constitute the intermediate part of the caisson-float-ramp assembly and are connected to the caisson in a removable manner so that they can be detached from it. The ramps are articulated at the end of the float. On the three caisson 2, float 3 and ramp 4 elements, a foldable shielding system is integrated: during deployment of the caisson-float-ramp assemblies, three jacks per caisson, float and ramp deploy variable shielding elements entailing lower shield 311 and upper shield 312 and pedestrian flooring 32 in order to optimize the general hydrodynamic quality of the vehicle and to widen the track or parking surface for the passage of pedestrians.

FIG. 17 shows the float 3 and ramp 4 assembly in partially deployed position, ramp 4 having been pivoted partially around axis C of the articulation connecting float 3 and ramp 4 together.

The deployment of ramp 4 is actuated by jack 33 which, by bringing out its mobile rod, makes possible the pivoting of control bar 34 around a pivot connected with float 3. The pivoting of the control bar leads to the pivoting of the ramp around axis C by the intermediary of rocker bar 35 which is attached at another pivot to ramp 4, on one hand, and at still another pivot to control bar 34, on the other hand. This arrangement makes possible a 180° rotation of ramp 4 with respect to float 3 without excessively stepping down the load, while remaining compact in folded up position. FIGS. 18A to 18D show the deployment of ramp 4 at the beginning, in two intermediate steps and at the end of deployment.

The control bar mechanism induces a certain stepping down of the load in the jack, this stepping down being rather extensive in deployed position. The system represented in FIGS. 17 and 18A-18D does not absorb the load of boarding of the vehicle because the locks immobilize the system in deployed position as well as in folded up position. The locking of the ramp under the float, when the ramp is deployed, not only contributes better stability of the float 3-ramp 4 sub-assembly but also plays a roll as means of relieving extensive stress. In effect, when ramp 4 is deployed and rests on a bank, any vehicle boarding the ferry or floating bridge will exert a maximum force on the jacks at the time when it is positioned over the hinge represented by axis C. This maximum force is absorbed by the lock when it is positioned.

FIGS. 19A, 19B, on one hand, and FIGS. 20A-20E, on the other hand, represent locking means intended for locking the ramp respectively in deployed position or in folded up position. For locking in deployed position, these means are related to a so-called "hammer" system because of the general shape of the means of anchoring which is used. This system includes compact piece 41 with an arm articulated by one of its opposite ends on float 3 and which is provided, at the other of the two opposite ends of the arm, with an anchoring head extending essentially transversely both with respect to the longitudinal extent of the arm and with respect to the axis of articulation of the arm. Compact piece 41 is articulated on the edge of ramp 4 which will come in contact with float 3 and will become lodged in a female receptacle configured in the float. When hammer 41 is engaged in this receptacle, the degree of freedom of rotation of ramp 4 around its hinge C is cancelled.

For locking in the folded up position, the locking means are related to a so-called "hook" system which includes hook 36 articulated on the interior side of the float, as well as jack 37 configured and arranged so that it can actuate hook 36 respectively for locking and unlocking ramp 4. This unlocking operation and the reverse of it take place in an automated manner from the control station of the vehicle of the invention.

During the production of a ferry or floating bridge, inter-vehicle connection means make it possible to lock two adjacent vehicles of the invention together. The inter-vehicle connection means are of short, mixed or long type depending on the most appropriate configuration in operation. Moreover, the inter-vehicle connection means are arranged symmetrically so as to allow any imaginable deployment combinations.

Thus, the inter-vehicle connection means include, for example, male locking means and female locking means on each caisson or float-ramp interface, as represented in FIGS. 21A and 21B and in more detail in FIGS. 22A, 22B.

Another arrangement is obtained, for example, by placing male locking means on the interfaces of the right caisson or on the right float-ramp sub-assembly, and female locking means on the interfaces of the left caisson or left float.

Furthermore, the locking system is advantageously completed by respectively male and female centerers molded or mounted, for example, on the floats.

The details of an inter-vehicle connection system are represented in FIGS. 21A, 21B and in more detail in FIGS. 22A and 22B.

Male locking means 61 are hooks maintained inclined towards the center by springs 62. During connection, female locking means 63, which have crosspieces 64 and screws 65, separate outward by rotation of screws 65. This separation leads to contact between crosspieces 64 and hooks 61 which will be led to swing inward and hook rigid peripheral frame 66 of the other float 3. The contact between hooks 61 and frame 66 forms the connection between floats.

A characteristic feature of the system which is represented is that, besides the system of locking between floats, a pre-locking system is integrated so that it is possible to connect the floating modules with more precision and ease during maneuvers in a strong current.

The functioning of the pre-locking system is the following. In the case of a dynamic docking approach, body 71 arranged rigidly projecting with respect to the interface of the float and whose shape is at least partially pointed or pyramidal, finds itself facing opening 72 formed on the interface float. During the phase of entry of body 71, which is configured so that it can capture differences in the levels on the order of 100 mm between the axis of body 71 and a horizontal median plane of opening 72, point 73 of body 71 pushes pawl 74 in order to allow swinging of hook 75 with which it is connected. This swinging leads to the lodging of hook 75 in cavity 76 of body 71. Cam system 77 stops pawl 74 discontinuously and hook 75 from swinging back in the opposite direction when body 71 tries to come back out. The pre-locking is then realized.

The disengagement of body 71 for the disconnection of the modules takes place by pivoting of handle 78 in order to raise cam system 77 and thus allow hook 75 to come out of cavity 76 of body 71.

In the same manner as for the interface locks for connection between floats 3, caisson locking means are composed, on one hand, of pivoting hooks, and on the other hand, of crosspieces sliding on screws. This arrangement has been chosen so that the interfaces are compatible and so that it is thus possible to connect a caisson either to another caisson or to a float on the folded ramp side.

FIGS. 23A and 23B respectively represent male locking means and female locking means. These two figures also show the arrangement of centerers on the two elements hooked and locked together. The centerers are referenced respectively 81 and 82.

It should be noted that the interface of the floats on the caisson side also has a locking interface similar to that represented for the locking of two caissons together or of two floats together. Likewise, the pre-locking systems are also identical to those disclosed in the preceding according to the connection between floats, seeing that the locking between two adjacent vehicles has to be possible regardless of the deployment configuration of each of the two vehicles to be connected.

In the case of mixed or short deployments, floats 3 with folded ramps 4 which are situated on the short deployment side remain on body 3. However, as already mentioned above, for example, in reference to FIG. 6A, floats 3 intended for passing over body 1 cannot remain in their initial position because the pivoting of caissons 2, which takes place regardless of the deployment configuration, requires disengagement of the floats towards the front or towards the rear of the vehicle in order to create the free space necessary for the pivoting to be possible. The movement of floats 3 is therefore a linear translation movement towards the exterior of the vehicle, that is to say, respectively towards the front and towards the rear of the vehicle according to the longitudinal axis of body 1.

As represented in FIG. 24, the translation movement is facilitated by rollers 91, and guiding is ensured by rails 92 which are attached on the rear part of the body and on cabin 5. This system requires a slight rise of central pivot 9 in the case of long deployment in order to disengage floats 3 with ramp 4 from the rails of the guides. The rise is on the order of 50 mm. The translation of the float 3-ramp 4 sub-assembly is actuated by rollers 91 mounted so as to turn on body 1.

The invention claimed is:

1. An amphibious vehicle comprising:
   elements arranged on a self-propelled rolling base, and oriented essentially parallel to a longitudinal axis of the rolling base, when the vehicle is in a folded configuration, for movement on land, and which can be deployed to form a track or bridge portion oriented transversely with respect to the longitudinal axis of the rolling base, when the vehicle, alone or with another vehicle of the same design, forms a floating bridge or ferry; and
   a deployment device deploying the elements by pivoting of four groups of the elements around four vertical shafts spaced from one another, in at least three different configurations, each group of the elements having at least one caisson, wherein the deployment device includes a central pivot having a lifting jack supported on the rolling base and one telescopic guiding leg per group of the elements, each of the telescopic legs serving as a vertical pivot shaft for a group of the elements.

2. The amphibious vehicle according to claim 1, including means for, when the vehicle is in the folded configuration, separating the caisson of each group of the elements, from the other elements in the group of elements, a direction roughly parallel to the longitudinal axis of rolling base.

3. The amphibious vehicle according to claim 1, including locking means for locking the elements in deployed positions and in folded positions.

4. The amphibious vehicle according to claim 1, including locking means for locking, with another vehicle of the same design, the locking means, locking two vehicles regardless of the deployment configuration of each of the vehicles.

5. The amphibious vehicle according to claim 1, wherein, according to a deployment configuration, each of the four groups of the elements consists of the at least one caisson.

6. The amphibious vehicle according to claim 1, wherein, according to a deployment configuration, two groups of the elements both consist of the at least one caisson and two other groups of the elements consist of the at least one caisson, a float, and a ramp.

7. The amphibious vehicle according to claim 1, wherein, according to a deployment configuration, each of the four groups of the elements consists of the at least one caisson, a float, and a ramp.

8. The amphibious vehicle according to claim 1, wherein each group of the elements includes, in addition to the at least one caisson, at least one of a float and a ramp.

9. An amphibious vehicle comprising:
   elements arranged on a self-propelled rolling base, and oriented essentially parallel to a longitudinal axis of the rolling base, when the vehicle is in a folded configuration, for movement on land, and which can be deployed to form a track or bridge portion oriented transversely with respect to the longitudinal axis of the rolling base, when the vehicle, alone or with another vehicle of the same design, forms a floating bridge or ferry; and
   a deployment device deploying the elements by pivoting of four groups of the elements around four vertical shafts spaced from one another, in at least three different configurations, each group of the elements having at least one caisson, wherein the deployment device includes attachment plates which can be inclined from a roughly vertical position for fixing the groups of the elements in deployed positions.

10. The amphibious vehicle according to claim 9, including locking means for locking the elements in deployed positions and in folded positions.

11. The amphibious vehicle according to claim 9, including locking means for locking, with another vehicle of the same design, the locking means locking two vehicles regardless of the deployment configuration of each of the vehicles.

12. The amphibious vehicle according to claim 9, wherein, according to a deployment configuration, each of the four groups of the elements consists of the at least one caisson.

13. The amphibious vehicle according to claim 9, wherein, according to a deployment configuration, two groups of the elements both consist of the at least one caisson and two other groups of the elements consist of the at least one caisson, a float, and a ramp.

14. The amphibious vehicle according to claim 9, wherein, according to a deployment configuration, each of the four groups of the elements consists of the at least one caisson, a float, and a ramp.

15. An amphibious vehicle comprising:
   elements arranged on a self-propelled rolling base, and oriented essentially parallel to a longitudinal axis of the rolling base, when the vehicle is in a folded configuration, for movement on land, and which can be deployed to form a track or bridge portion oriented transversely with respect to the longitudinal axis of the rolling base, when the vehicle, alone or with another vehicle of the same design, forms a floating bridge or ferry; and a deployment device deploying the elements by pivoting of four groups of the elements around four vertical shafts spaced from one another, in at least three different configurations, each group of the elements having at least one caisson, wherein the deployment device includes means for deployment of ramps with respect to floats with an increasing stepping down effect as the deployment of the ramps progresses.

16. The amphibious vehicle according to claim 15, including locking means for locking the elements in deployed positions and in folded positions.

17. The amphibious vehicle according to claim 15, including locking means for locking, with another vehicle of the same design, the locking means locking two vehicles regardless of the deployment configuration of each of the vehicles.

18. The amphibious vehicle according to claim 15, wherein, according to a deployment configuration, each of the four groups of the elements consists of the at least one caisson.

19. The amphibious vehicle according to claim 15, wherein, according to a deployment configuration, two groups of the elements both consist of the at least one caisson and two other groups of the elements consist of the at least one caisson, a float, and a ramp.

20. The amphibious vehicle according to claim 15, wherein, according to a deployment configuration, each of the four groups of the elements consists of the at least one caisson, a float, and a ramp.

* * * * *